US012770224B2

(12) United States Patent
He et al.

(10) Patent No.: US 12,770,224 B2
(45) Date of Patent: Oct. 20, 2026

(54) IMAGE SYNTHESIS METHOD AND APPARATUS, STORAGE MEDIUM, AND ELECTRONIC DEVICE

(71) Applicant: TENCENT TECHNOLOGY (SHENZHEN) COMPANY LIMITED, Shenzhen (CN)

(72) Inventors: Keke He, Shenzhen (CN); Junwei Zhu, Shenzhen (CN); Ying Tai, Shenzhen (CN); Chengjie Wang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 194 days.

(21) Appl. No.: 18/890,949

(22) Filed: Sep. 20, 2024

(65) Prior Publication Data

US 2025/0014149 A1 Jan. 9, 2025

Related U.S. Application Data

(63) Continuation of application No. PCT/CN2023/128423, filed on Oct. 31, 2023.

(30) Foreign Application Priority Data

Nov. 14, 2022 (CN) ......................... 202211422368.8

(51) Int. Cl.
*G06T 5/50* (2006.01)
*G06N 3/088* (2023.01)
(Continued)

(52) U.S. Cl.
CPC .................. *G06T 5/50* (2013.01); *G06T 5/60* (2024.01); *G06T 7/337* (2017.01); *G06V 10/761* (2022.01);
(Continued)

(58) Field of Classification Search
USPC .......................................... 382/155–157, 284
See application file for complete search history.

(56) References Cited

U.S. PATENT DOCUMENTS 7,787,664 B2 * 8/2010 Luo ......................... G06T 11/60 382/284
10,810,725 B1 10/2020 Dolhansky et al.
(Continued)

FOREIGN PATENT DOCUMENTS

CN 113240575 A 8/2021
CN 113706421 A 11/2021
CN 116958306 A 10/2023

OTHER PUBLICATIONS

The World Intellectual Property Organization (WIPO) International Search Report for PCT/CN2023/128423 Jan. 10, 2024 6 Pages (including translation).
(Continued)

*Primary Examiner* — Ishrat I Sherali
(74) *Attorney, Agent, or Firm* — Anova Law Group, PLLC

(57) ABSTRACT

An image synthesis method includes: obtaining a source image including source image identity information for synthesis and a template image including template image background information for synthesis; performing a target synthesis operation on the source image and the template image to obtain an initial synthesized image, the initial synthesized image including the source image identity information, the template image background information, and a partial region to be corrected; performing a target correction operation on the source image, the template image, and the initial synthesized image to obtain a target residual image; and synthesizing the initial synthesized image with the target residual image to generate a target synthesized image.

20 Claims, 7 Drawing Sheets

(51) Int. Cl.

| | |
|---|---|
| ***G06T 5/60*** | (2024.01) |
| ***G06T 7/33*** | (2017.01) |
| ***G06V 10/74*** | (2022.01) |
| ***G06V 10/77*** | (2022.01) |
| ***G06V 10/776*** | (2022.01) |
| ***G06V 10/82*** | (2022.01) |

(52) U.S. Cl.

CPC ........ *G06V 10/7715* (2022.01); *G06V 10/776* (2022.01); *G06V 10/82* (2022.01); *G06T 2207/20081* (2013.01); *G06T 2207/20084* (2013.01); *G06T 2207/20132* (2013.01); *G06T 2207/20221* (2013.01)

(56) References Cited

U.S. PATENT DOCUMENTS

| | | | | |
|---|---|---|---|---|
| 10,878,612 | B2 * | 12/2020 | Wang | G06V 40/171 |
| 11,120,595 | B2 * | 9/2021 | Miao | G06T 11/60 |
| 11,398,062 | B2 * | 7/2022 | Chen | G06V 40/168 |
| 12,211,178 | B2 * | 1/2025 | Hinz | G06T 5/50 |
| 12,299,963 | B2 * | 5/2025 | He | G06V 40/172 |
| 2018/0068178 | A1 * | 3/2018 | Theobalt | G06T 13/40 |
| 2020/0334867 | A1 * | 10/2020 | Chen | G06V 10/82 |
| 2024/0161465 | A1 * | 5/2024 | He | G06V 10/764 |
| 2024/0331093 | A1 * | 10/2024 | Xu | G06V 10/82 |
| 2024/0420288 | A1 * | 12/2024 | He | G06F 18/00 |

OTHER PUBLICATIONS

Generative Adversarial Architecture—Baidu Encyclopedia, https://baike.baidu.com/item/Gan/22181905, May 17, 2022 (May 17, 2022). 5 Pages (including translation).

"What is the core technology of AI face changing? What other Application scenarios are there besides the video face-changing app?", https://www.zhihu.com/question/343409385, (Year: 2019-2023).

Laing Zi Wei, "Shanghai Jiao Tong University finds a new way of "face-swapping": no fear of death lighting and straight man's perspectivelopen source", Zhihu, on-line, Retrieved on: Jan. 9, 2024, https://zhuanlan.zhihu.com/p/381217902, Jun. 16, 2021 (Jun. 16, 2021).

* cited by examiner

A target object is in a target pose

Template image in which the target object is occluded

IMAGE SYNTHESIS METHOD AND APPARATUS, STORAGE MEDIUM, AND ELECTRONIC DEVICE

CROSS-REFERENCES TO RELATED APPLICATIONS

This application is a continuation application of PCT Patent Application No. PCT/CN2023/128423, filed on Oct. 31, 2023, which claims priority to Chinese Patent Application No. 202211422368.8, filed on Nov. 14, 2022 and entitled "IMAGE SYNTHESIS METHOD AND APPARATUS, STORAGE MEDIUM, AND ELECTRONIC DEVICE", the entire contents of both of which are incorporated herein by reference.

FIELD OF THE TECHNOLOGY

The present disclosure relates to the field of computers, and in particular, to an image synthesis method and apparatus, a storage medium, and an electronic device.

BACKGROUND OF THE DISCLOSURE

Currently, image synthesis has a great many of application scenarios. An image synthesis process may include inputting a source image including source image identity information (for example, the source image identity information such as eye information and nose information) and a template image including template image background information (for example, the template image background information such as a face angle and a facial expression), to output a synthesized image in which the template image background information in the template image is kept and that is as similar as possible to the source image identity information included in the source image. However, when an object in a template image has a large pose or the object in the template image is occluded, the output synthesized image may have a poor effect.

SUMMARY

Embodiments of the present disclosure provide an image synthesis method and apparatus, a storage medium, and an electronic device, to solve at least a technical problem that a synthesized image has a poor effect and looks unnatural as a result of an object having a large pose or being occluded in a template image for synthesis.

According to an aspect of the embodiments of the present disclosure, an image synthesis method is provided, including: obtaining a source image and a template image to be processed, the source image including source image identity information for synthesis, and the template image including template image background information for synthesis; performing a target synthesis operation on the source image and the template image to obtain an initial synthesized image, the initial synthesized image including the source image identity information, the template image background information, and a partial region to be corrected; performing a target correction operation on the source image, the template image, and the initial synthesized image to obtain a target residual image; and synthesizing the initial synthesized image with the target residual image to generate a target synthesized image, the target synthesized image including the source image identity information, the template image background information, and the partial region corrected based on the target residual image.

According to another aspect of the embodiments of the present disclosure, an image synthesis apparatus is further provided, including: an obtaining module, configured to obtain a source image and a template image to be processed, the source image including source image identity information for synthesis, and the template image including template image background information for synthesis; a first synthesis module, configured to perform a target synthesis operation on the source image and the template image to obtain an initial synthesized image, the initial synthesized image including the source image identity information, the template image background information, and a partial region to be corrected; a correction module, configured to perform a target correction operation on the source image, the template image, and the initial synthesized image to obtain a target residual image; and a second synthesis module, configured to synthesize the initial synthesized image with the target residual image to form a target synthesized image, the target synthesized image including the source image identity information, the template image background information, and the partial region corrected based on the target residual image.

According to still another aspect of the embodiments of the present disclosure, a non-transitory computer-readable storage medium is provided. A processor of a computer device reads computer instruction stored in the computer-readable storage medium. The processor executes the computer instruction, causing the computer device to perform the image synthesis method described above.

According to still another aspect of the embodiments of the present disclosure, an electronic device is further provided, including a memory and a processor, the memory having a computer program stored therein, and the foregoing processor being configured to perform the foregoing image synthesis method through the computer program.

In the embodiments of the present disclosure, a robust image synthesis result can still be obtained in a case of a large pose and occlusion, so as to meet face swapping requirements in some difficult scenarios, thereby optimizing an effect of a synthesized image in the case of the large pose or the object being occluded. In this way, the synthesized image is more robust and has a more natural technical effect, thereby solving the technical problem that a synthesized image has a poor effect and looks unnatural as a result of an object having a large pose or being occluded in a template image for synthesis.

BRIEF DESCRIPTION OF THE DRAWINGS

The accompanying drawings described herein are used to provide a further understanding of the present disclosure, and constitute a part of the present disclosure. Exemplary embodiments of the present disclosure and descriptions thereof are used to explain the present disclosure, and do not constitute any inappropriate limitation on the present disclosure. In the accompanying drawings.

DESCRIPTION OF EMBODIMENTS

To enable a person skilled in the art to better under the solutions of the present disclosure, the following clearly and completely describes the technical solutions in embodiments of the present disclosure with reference to the accompanying drawings in the embodiments of the present disclosure. Apparently, the described embodiments are merely some rather than all of the embodiments of the present disclosure. All other embodiments obtained by a person of ordinary skill in the art based on the embodiments of the present disclosure without creative efforts shall fall within the protection scope of the present disclosure.

Terms "first", "second", and the like in the specification and claims of the present disclosure and the foregoing accompanying drawings are used for distinguishing similar objects, and are not necessarily used for describing a specific order or sequence. Data used in this way is exchangeable in a proper case, so that the embodiments of the present disclosure described herein can be implemented in another order other than those shown or described herein. Moreover, terms "include", "have", and any other variants are intended to cover non-exclusive inclusion. For example, a process, a method, a system, a product, or a device that includes a list of operations or units is not necessarily limited to those expressly listed operations or units, but may include other operations or units not expressly listed or inherent to the process, the method, the product, or the device.

First, some terms that appear in the descriptions of the embodiments of the present disclosure are explained as follows:

Generative adversarial network (GAN): It is a method of unsupervised learning that makes two neural networks compete each other to learn and consists of a generative network and a discriminative network. The generative network is configured to take a sample randomly from a latent space as an input, and an output result thereof needs to imitate a real sample in a training set as much as possible. An input to the discriminative network is a real sample or an output of the generative network, with the purpose of distinguishing the output of the generative network from the real sample as much as possible. However, the generative network needs to deceive the discriminative network as much as possible. Two networks compete against each other, constantly adjust parameters, and finally generate realistic pictures.

Video face swapping: A definition of face swapping is swapping an inputted source image source to a template of a template face, and causing an outputted face to fake information such as an expression, an angle, and background of the template face.

Ground truth: It is referred to as GT for short.

The present disclosure is described below with reference to the embodiments.

Figure 1:
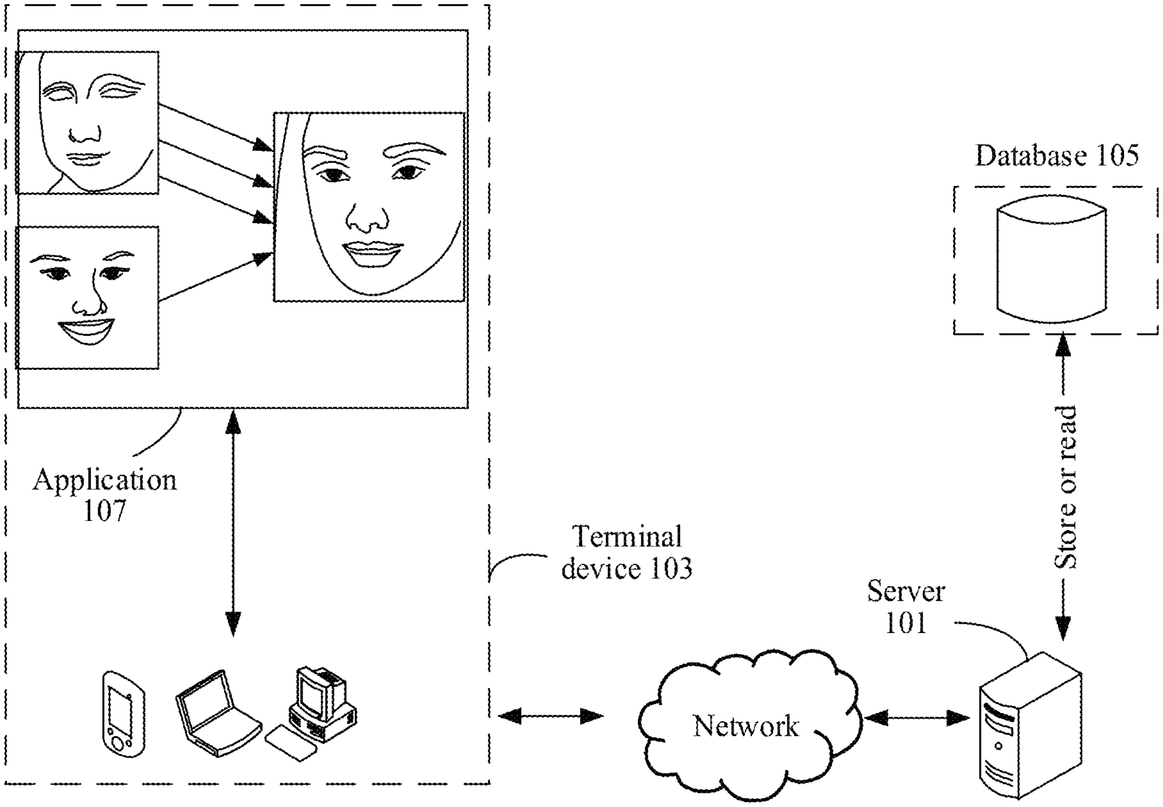
FIG. 1 is a schematic diagram of an application environment of an image synthesis method according to an embodiment of the present disclosure.

According to an aspect of the embodiments of the present disclosure, an image synthesis method is provided. In the embodiments of the present disclosure, the foregoing image synthesis method may be applied to a hardware environment composed of a server 101 and a terminal device 103 as shown in FIG. 1. As shown in FIG. 1, the server 101 is connected to the terminal device 103 through a network, and may be configured to provide a service for the terminal device or an application installed on the terminal device. The application may be a video application, an instant messaging application, a browser application, an educational application, a gaming application, and the like. A database 105 may be arranged on the server 101 or independently of the server 101 to provide a data storage service for the server 101, for example, a game data storage server. The foregoing network may include but is not limited to a wired network and a wireless network. The wired network includes a local area network, a metropolitan area network, and a wide area network. The wireless network includes Bluetooth, Wi-Fi, and another network that implements wireless communication. The terminal device 103 may be a terminal configured with an application program, and may include but is not limited to at least one of the following computer devices: a mobile phone (such as an Android mobile phone and an iOS mobile phone), a notebook computer, a tablet computer, a palmtop, a mobile Internet device (MID), a PAD, a desktop computer, a smart television, a smart voice interaction device, a smart home appliance, an on-board terminal, and an aircraft. The foregoing server 101 may be a single server, or may be a server cluster composed of a plurality of servers, or a cloud server.

As shown in FIG. 1, the foregoing image synthesis method may be implemented on the terminal device 103 through the following operations.

S1: Obtain, on the terminal device 103, a source image and a template image to be processed, the source image including source image identity information for synthesis, and the template image including template image background information for synthesis. A target object in the template image has a target pose or the target object is occluded.

S2: Perform, on the terminal device 103, a target synthesis operation on the source image and the template image, to obtain an initial synthesized image, the initial synthesized image including the source image identity information, the template image background information, and a partial region to be corrected.

S3: Perform, on the terminal device 103, a target correction operation on the source image, the template image, and the initial synthesized image, to obtain a target residual image, the target residual image being configured to correct the partial region.

S4: Synthesize, on the terminal device 103, the initial synthesized image with the target residual image to form a target synthesized image, the target synthesized image including the source image identity information, the template image background information, and the partial region corrected based on the target residual image.

In the embodiments of the present disclosure, the foregoing image synthesis method may further be implemented by a server, for example, the server 101 shown in FIG. 1, or jointly implemented by the terminal device and the server.

The foregoing is merely an example, and is not specifically limited in the embodiments of the present disclosure.

Figure 2:
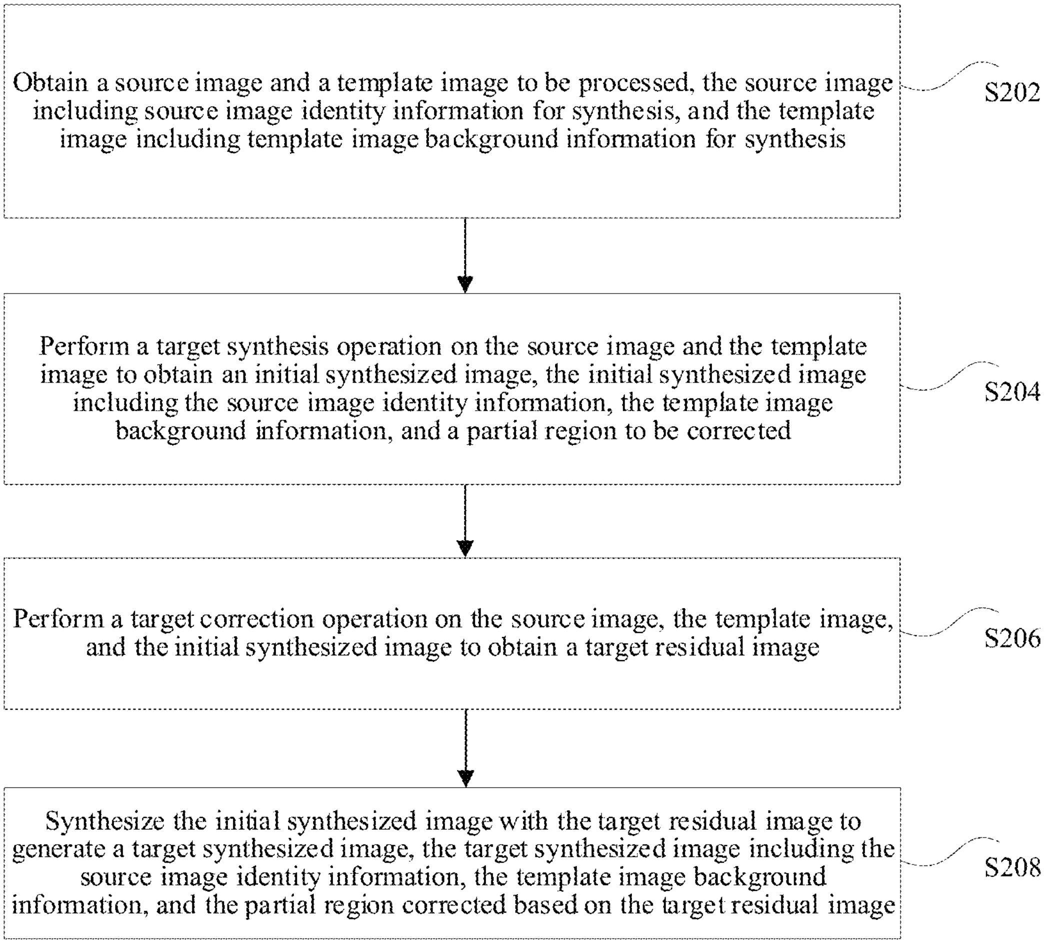
FIG. 2 is a flowchart of an image synthesis method according to an embodiment of the present disclosure.

In an exemplary implementation, as shown in FIG. 2, the foregoing image synthesis method includes the following operations.

S202: Obtain a source image and a template image to be processed, the source image including source image identity information for synthesis, the template image including template image background information for synthesis, and a target object in the template image having a target pose or the target object being occluded.

In this embodiment of the present disclosure, the foregoing source image may include, but is not limited to, an image that needs to use identity information. The foregoing identity information may include, but is not limited to, a facial feature, features of five sense organs, and the like in the image. The foregoing template image may include, but is not limited to, an image that needs to use background information. The foregoing background information may include, but is not limited to, an expression feature, an angle feature, a background feature, and the like in the image.

In this embodiment of the present disclosure, the foregoing target object may include, but is not limited to, a character, an animal, a game character, a character in a film or a television program, a virtual character, and the like included in the template image. The foregoing target pose may mean that a pose of the foregoing target object in the template image belongs to a large pose. The foregoing large pose may mean a pose having a yaw angle greater than a preset angle value.

Figure 3:
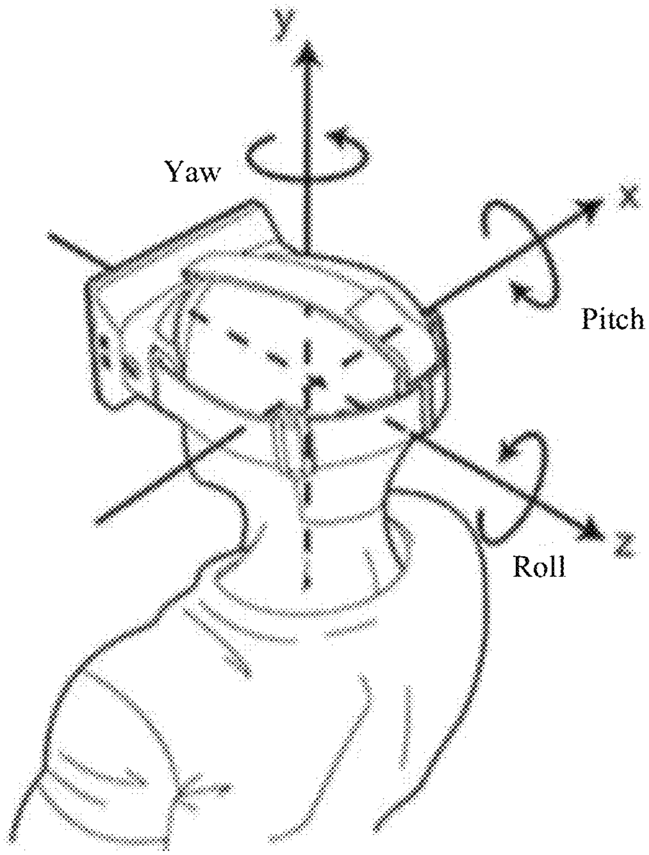
FIG. 3 is a schematic diagram of a pose of a target object in a three-dimensional space according to an embodiment of the present disclosure.

Exemplarily, FIG. 3 is a schematic diagram of a pose of a target object in a three-dimensional space according to an embodiment of the present disclosure. As shown in FIG. 3, a face (or a head) of the target object in the three-dimensional space (for example, along an x-axis, a y-axis, and a z-axis of a world coordinate system) mainly moves at three angles, namely a yaw angle, a pitch angle, and a roll angle, which are generally referred to as face pose angles. The three angles correspond to three situations, namely, a face rotating left and right (rotating along a y-axis), up and down (rotating along an x-axis), and sideways (rotating along a z-axis).

Figure 4:
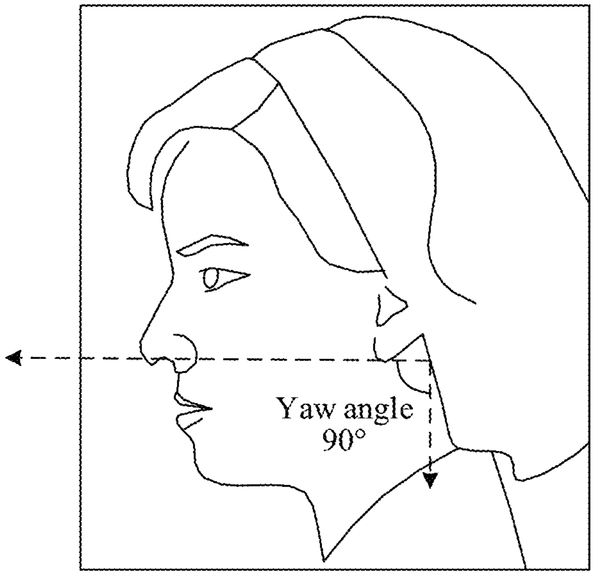
FIG. 4 is a schematic diagram of a target object having a target pose according to an embodiment of the present disclosure.

In an exemplary embodiment, FIG. 4 is a schematic diagram of a target object having a target pose according to an embodiment of the present disclosure. As shown in FIG. 4, when a face yaw angle (for example, 90°) of the target object in a template image is greater than a preset angle value (for example, 45°), the target object in the template image has a target pose.

In this embodiment of the present disclosure, the foregoing target object being occluded may mean that a face of the target object includes a certain object and the object occludes a partial region of the face of the target object.

Figure 5:
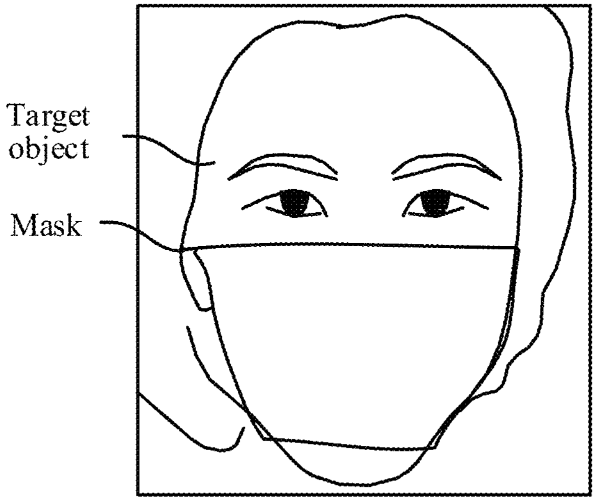
FIG. 5 is a schematic diagram showing that a target object according to an embodiment of the present disclosure is occluded.

Exemplarily, FIG. 5 is a schematic diagram of a target object being occluded according to an embodiment of the present disclosure. As shown in FIG. 5, a face object in a three-dimensional space wears a mask. Since the mask occludes another facial region other than eyes, in this case, the target object is occluded by the mask. In other words, the foregoing target object is occluded.

S204: Perform a target synthesis operation on a source image and a template image, to obtain an initial synthesized image, the initial synthesized image including source image identity information, template image background information, and a partial region to be corrected.

In this embodiment of the present disclosure, the foregoing target synthesis operation may include, but is not limited to, inputting the source image and the template image into a pre-trained image synthesis model for synthesis. The foregoing initial synthesized image is a synthesized image whose effect needs to be improved. The foregoing partial region to be corrected may include, but is not limited to, a region in a combined region of the source image and the template image in which abnormal display such as blurring or ghosting occurs.

Figure 6:
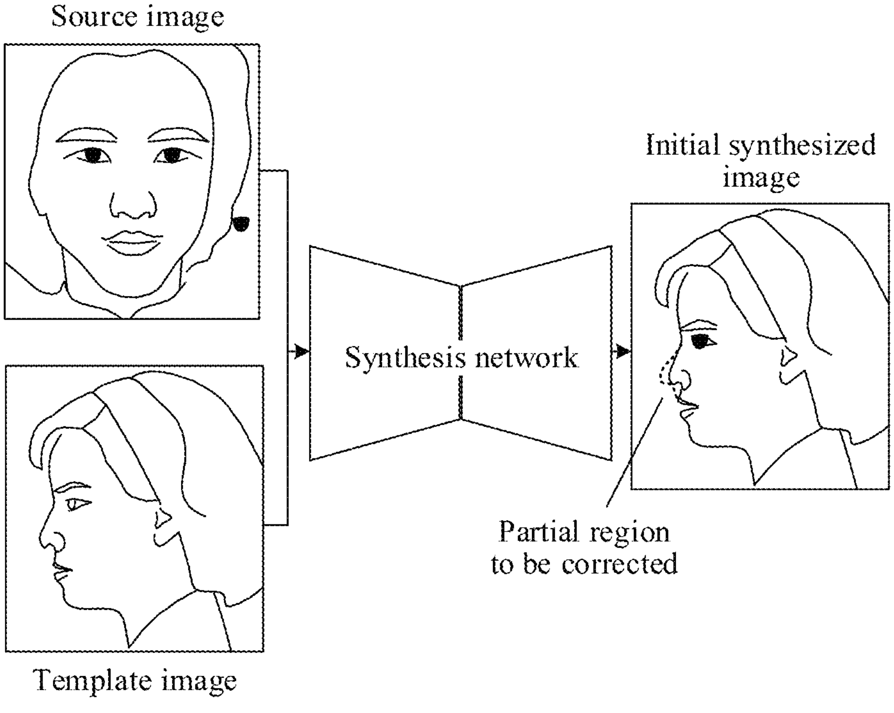
FIG. 6 is a schematic diagram of an image synthesis method according to an embodiment of the present disclosure.

Exemplarily, FIG. 6 is a schematic diagram of an image synthesis method according to an embodiment of the present disclosure. As shown in FIG. 6, a source image and a template image are inputted into a synthesis network (an image synthesis model) to obtain an initial synthesized image. Ghosting occurs on a nose part of the initial synthesized image, the region (the nose part) being the foregoing partial region to be corrected.

S206: Perform a target correction operation on the source image, the template image, and the initial synthesized image to obtain a target residual image, the target residual image being configured to correct the partial region to be corrected.

In this embodiment of the present disclosure, the foregoing target correction operation may include, but is not limited to, inputting the source image, the template image, and the initial synthesized image into a pre-trained image correction model for synthesis. The foregoing initial synthesized image is a synthesized image whose effect needs to be improved. The foregoing partial region may include, but is not limited to, a region to be corrected in a combined region of the source image and the template image in which blurring or ghosting occurs. Correcting the partial region (or correcting the partial region to be corrected) mean correcting the foregoing partial region to be corrected based on the target residual image.

In this embodiment of the present disclosure, the foregoing target residual image may include, but is not limited to, an image outputted by the foregoing image correction model that is configured to correct the foregoing partial region to be corrected.

Figure 7:
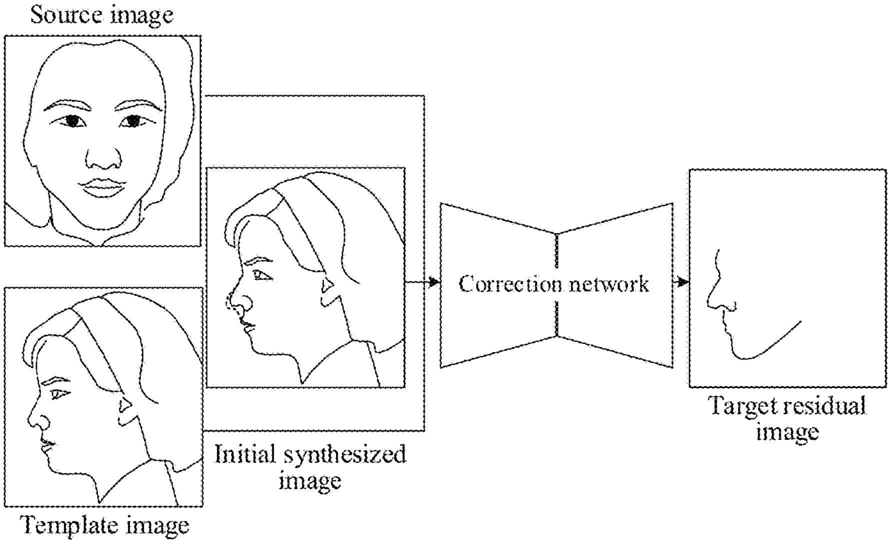
FIG. 7 is a schematic diagram of still another image synthesis method according to an embodiment of the present disclosure.

Exemplarily, FIG. 7 is a schematic diagram of still another image synthesis method according to an embodiment of the present disclosure. As shown in FIG. 7, a source image, a template image, and an initial synthesized image are inputted into a correction network to obtain a target residual image. Ghosting occurs on a nose part of the initial synthesized image, the region being the foregoing partial region to be corrected, and the target residual image configured to correct the partial region may be generated through the foregoing correction network.

S208: Synthesize the initial synthesized image with the target residual image to form a target synthesized image, the target synthesized image including source image identity information, template image background information, and the partial region corrected based on the target residual image.

In this embodiment of the present disclosure, the synthesizing the initial synthesized image with the target residual image to form the target synthesized image may include but is not limited to a superposition operation. The superposition operation is superimposing pixel values of pixels in the initial synthesized image and the target residual image, to obtain the foregoing target synthesized image.

The foregoing target synthesized image includes both the source image identity information and the template image background information. In addition, the partial region to be corrected in the initial synthesized image is normally displayed in the target synthesized image, and is displayed as a corrected partial region.

In an exemplary embodiment, the foregoing image synthesis method may include, but is not limited to, implementation based on artificial intelligence (AI). AI is a theory, a method, a technology, and an application system that use a digital computer or a machine controlled by the digital computer to simulate, extend, and expand human intelligence to sense an environment, obtain knowledge, and obtain an optimal result with knowledge. In other words, AI is a comprehensive technology in computer science and attempts to understand the essence of intelligence and produce a new intelligent machine that can react in a manner similar to human intelligence. AI is to study the design principles and implementation methods of various intelligent machines, to enable the machines to have the functions of perception, reasoning, and decision-making.

The AI technology is a comprehensive discipline, and involves a wide range of fields including both the hardware-level technology and the software-level technology. Basic AI technologies generally include technologies such as a sensor, a dedicated AI chip, cloud computing, distributed storage, a big data processing technology, an operating/interaction system, and electromechanical integration. AI software technologies mainly include several major directions such as a computer vision (CV) technology, a speech processing technology, a natural language processing technology, and machine learning/deep learning.

CV is a field of science that studies how to use a machine to "see", and furthermore, that uses a camera and a computer to replace human eyes to perform machine vision such as recognition and measurement on a target, and further perform graphic processing, so that the computer processes the target into an image more suitable for human eyes to observe, or an image transmitted to an instrument for detection. As a scientific discipline, CV studies related theories and technologies and attempts to establish an AI system that can obtain information from images or multi-dimensional data. The CV technology generally includes technologies such as image processing, image recognition, image semantic understanding, image retrieval, optical character recognition (OCR), video processing, video semantic understanding, video content/behavior recognition, three-dimensional object reconstruction, 3D technology, virtual reality, augmented reality, and simultaneous localization and mapping, and further includes common biometric recognition technologies such as face recognition and fingerprint recognition.

Exemplarily, the technology may include, but is not limited to, using a GAN to perform the foregoing target synthesis operation and the foregoing target correction operation. The GAN is a deep learning model, and is one of the most promising unsupervised learning methods in complex distribution in recent years. The GAN is configured to generate quite good output through mutual game learning of (at least) two modules in a framework thereof, namely a generative model and a discriminative model.

For another example, a source image and a template image are inputted into a GAN to perform a target synthesis operation to obtain an initial synthesized image, then the source image, the template image, and the initial synthesized image are inputted into another GAN to perform a target correction operation to obtain a target residual image, and finally, the initial synthesized image is synthesized with the target residual image to form the foregoing target synthesized image.

An existing method cannot optimize an effect of the synthesized image in a case of a large pose and occlusion. A problem of jittering of identity information of the synthesized image may occur in a case of face ghosting or occlusion, resulting in a bad effect of the synthesized image. However, through the embodiments of the present disclosure, a robust image synthesis result can still be obtained in the case of the large pose and occlusion, so as to meet face swapping requirements in some difficult scenarios, thereby optimizing the effect of the synthesized image in the case of the large pose or the object being occluded. In this way, the synthesized image is more robust and has a more natural technical effect, thereby solving the technical problem that a synthesized image has a poor effect and looks unnatural as a result of an object having a large pose or being occluded in a template image for synthesis.

In an exemplary solution, the performing a target synthesis operation on the source image and the template image to obtain an initial synthesized image includes: inputting the source image into a target synthesis network together with the template image, to obtain the initial synthesized image, the initial synthesized image being obtained from the target synthesis network in the following manners: performing a concatenating operation on the source image and the template image to obtain a first concatenated image, a quantity of channels of the first concatenated image being a sum of quantities of channels of the source image and the template image; performing an encoding operation on the first concatenated image to obtain first intermediate layer feature information with an increased quantity of channels; and performing a decoding operation on the first intermediate layer feature information to obtain the initial synthesized image with a decreased quantity of channels, a quantity of channels of the initial synthesized image being the same as the quantity of channels of the source image.

In this embodiment of the present disclosure, the foregoing concatenating operation may include, but is not limited to, performing a feature extraction operation on each of the source image and the template image, and then superimposing extracted feature maps to obtain the foregoing first concatenated image.

For example, assuming that the source image and the template image both have a quantity of channels of 3 (RGB) and dimensions of 512*512 pixels, the source image and the template image are concatenated to obtain a first concatenated image having 512*512*6 dimensions.

In this embodiment of the present disclosure, the foregoing encoding operation may include, but is not limited to, performing a convolution operation on the first concatenated image, and the foregoing decoding operation may include, but is not limited to, performing a deconvolution operation on the first concatenated image. For example, the encoding operation is configured to represent an input as a feature vector (for feature extraction). For example, the decoding operation is configured to represent the feature vector as an output (including classification).

For example, the first concatenated image having an input of 512*512*6 dimensions is gradually encoded to have 256*256*32 dimensions, 128*128*64 dimensions, 64*64*128 dimensions, 32*32*256 dimensions, and so on, so as to obtain the foregoing first intermediate layer feature information. The first intermediate layer feature information is transmitted to a decoder. The decoder is mainly configured to perform a deconvolution operation, gradually double a resolution, and decode the first intermediate layer feature information into 32*32*256 dimensions, 64*64*128 dimensions, 128*128*64 dimensions, 256*256*32 dimensions, and 512*512*3 dimensions, and finally obtains the initial synthesized image.

In an exemplary solution, the foregoing method further includes: training a first synthesis network to obtain the target synthesis network. The first synthesis network is trained to obtain the target synthesis network in the following manners: obtaining a first sample source image, a first sample template image, and a label image, the label image being a desired predetermined image obtained through synthesizing the first sample source image with the first sample template image; performing a concatenating operation on the first sample source image and the first sample template image to obtain a first sample concatenated image, a quantity of channels of the first sample concatenated image being a sum of quantities of channels of the first sample source image and the first sample template image; performing an encoding operation on the first sample concatenated image through the first synthesis network, to obtain first sample intermediate layer feature information with an increased quantity of channels; performing a decoding operation on the first sample intermediate layer feature information through the first synthesis network, to obtain a first sample initial synthesized image with a decreased quantity of channels, a quantity of channels of the first sample initial synthesized image being the same as a quantity of channels of the first sample source image; calculating a first target loss value of the first synthesis network based on the first sample initial synthesized image, the first sample source image, and the label image; and determining the first synthesis network as the target synthesis network in response to that the first target loss value meets a first loss condition.

In this embodiment of the present disclosure, the foregoing concatenating operation may include, but is not limited to, performing the feature extraction operation on each of the first sample source image and the first sample template image, and then superimposing extracted feature maps to obtain the foregoing first sample concatenated image.

For example, if the first sample source image and the first sample template image both have a quantity of channels of 3 (RGB) and dimensions of 512*512 pixels, the first sample source image and the first sample template image are concatenated to obtain a first sample concatenated image having 512*512*6 dimensions.

In this embodiment of the present disclosure, the foregoing encoding operation may include, but is not limited to, performing a convolution operation on the first sample concatenated image, and the foregoing decoding operation may include, but is not limited to, performing a deconvolution operation on the first sample concatenated image.

For example, the first sample concatenated image having an input of 512*512*6 dimensions is gradually encoded to have 256*256*32 dimensions, 128*128*64 dimensions, 64*64*128 dimensions, 32*32*256 dimensions, and so on, so as to obtain the foregoing first sample intermediate layer feature information and transmit the first sample intermediate layer feature information to the decoder. The decoder is mainly configured to perform a deconvolution operation, gradually double a resolution, and decode the first intermediate layer feature information into 32*32*256 dimensions, 64*64*128 dimensions, 128*128*64 dimensions, 256*256*32 dimensions, and 512*512*3 dimensions, and finally obtains a sample initial synthesis result.

In this embodiment of the present disclosure, the foregoing first target loss value may include, but is not limited to, an overall loss value of the first synthesis network. The foregoing first loss condition may be a preset loss condition, for example, the first target loss value is less than a first preset value. In this case, the first synthesis network is determined as the target synthesis network. In response to that the first target loss value does not meet the first loss condition, a parameter of the first synthesis network is adjusted until the first target loss value meets the first loss condition.

In an exemplary solution, the calculating a first target loss value of the first synthesis network based on the first sample initial synthesized image, the first sample source image, and the label image includes: performing the feature extraction operation on the label image by using a pre-trained feature extraction module, to extract feature information of different levels of the label image and obtain a first set of sample feature maps, each sample feature map of the first set of sample feature maps corresponding to feature information of one level extracted from the label image; performing the feature extraction operation on the first sample initial synthesized image by using the feature extraction module, to extract feature information of different levels of the first sample initial synthesized image and obtain a second set of sample feature maps, each sample feature map of the second set of sample feature maps corresponding to feature information of one level extracted from the first sample initial synthesized image; calculating a first loss value based on the first set of sample feature maps and the second set of sample feature maps, the first loss value being calculated from the feature information of each of the different levels extracted from the label image and the feature information of each of the different levels extracted from the first sample initial synthesized image; and determining the first loss value and a reconstruction loss value of the first synthesis network together as the first target loss value, the reconstruction loss value being a loss value for performing the encoding operation and the decoding operation.

In this embodiment of the present disclosure, the foregoing label image is a predetermined image during training. The image is a target of a current training process, and may be manually generated in advance, for example, a GT image generated in advance through manual annotation.

In this embodiment of the present disclosure, the foregoing feature extraction module may include but is not limited to pre-trained AlexNet, which is configured to extract features of the image at different layers and calculate a learned perceptual image patch similarity (LPIPS) loss.

Figure 8:
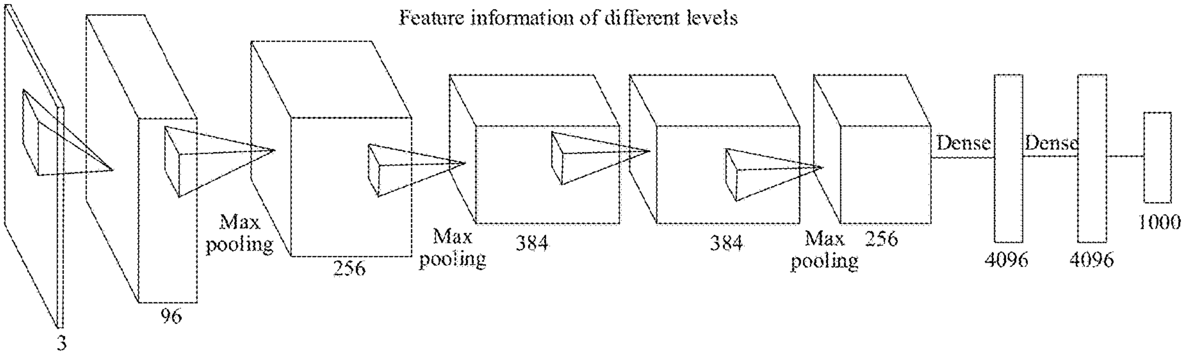
FIG. 8 is a schematic diagram of yet another image synthesis method according to an embodiment of the present disclosure.

Exemplarily, FIG. 8 is a schematic diagram of yet another image synthesis method according to an embodiment of the present disclosure. As shown in FIG. 8, in a deep network model, a feature at a low level can represent a low-level feature such as a line or a color, and a feature at a high level can represent a high-level feature such as a component. Therefore, a similarity of different images may be measured through features extracted by AlexNet.

For example, a first set of sample feature maps obtained by performing the feature extraction operation on a label image may specifically include but are not limited to the following sample feature maps of 4 levels: gt_img_fea1, gt_img_fea2, gt_img_fea3, gt_img_fea4=alexnet_feature (gt). For example, the feature extraction operation is performed on a first sample initial synthesized image to obtain a second set of sample feature maps, which may include but are not limited to the following sample feature maps of 4 levels: result_fea1, result_fea2, result_fea3, and result_fea4=alexnet_feature (fake1).

A first loss value is calculated based on the first set of sample feature maps and the second set of sample feature maps in the following manners:

$$LPIPS\_loss = |result\_fea1 - gt\_img\_fea1| + |result\_fea2gt\_img\_fea2| + |result\_fea3 - gt\_img\_fea3| + |result\_fea4 - gt\_img\_fea4|.$$

In the embodiments of the present disclosure, an example in which the foregoing first synthesis network is a GAN is used. A reconstruction loss value of the foregoing first synthesis network may include but is not limited to a composition of Reconstruction_loss+D_loss+G_loss, the Reconstruction_loss corresponding to the foregoing reconstruction loss value, the G_loss being a loss value of a generator, and the foregoing D_loss being a loss value of a discriminator.

In an exemplary solution, the calculating a first target loss value of the first synthesis network based on the first sample initial synthesized image, the first sample source image, and the label image includes: performing a recognition operation on the first sample initial synthesized image, to obtain a first sample feature vector, the first sample feature vector representing source image identity information in the first sample initial synthesized image; performing the recognition operation on the first sample source image, to obtain a second sample feature vector, the second sample feature vector representing source image identity information in the first sample source image; calculating a second loss value based on the first sample feature vector and the second sample feature vector, the second loss value representing a similarity between the first sample feature vector and the second sample feature vector; and determining the second loss value and a reconstruction loss value of the first synthesis network together as the first target loss value, the reconstruction loss value being a loss value for performing the encoding operation and the decoding operation.

In this embodiment of the present disclosure, the foregoing recognition operation may include, but is not limited to, being implemented by a face recognition network. The face recognition network is configured to extract a face feature, and this feature generally has 1024 dimensions. It is desirable that identity information of an image to be synthesized is as similar as possible to identity information of a source image. Therefore, the face feature is extracted to provide constraints.

For example, a recognition feature of the first sample initial synthesized image is extracted to obtain fake1_id_features, and a recognition feature of the first sample source image is extracted to obtain source_id_features. An ID estimation loss (corresponding to the foregoing second loss value) is calculated by using a cosine similarity (which may further include, but is not limited to, a Euclidean distance). Since it is desirable that the first sample initial synthesized image to be generated is as similar as possible to the first sample source image, ID_loss=1−cosine_similarity (fake1_id_features, source_id_features). The cosine similarity is calculated as follows:

$$\text{similarity} = \cos(\theta) = \frac{A \cdot B}{\|A\|\|B\|} = \frac{\sum_{i=1}^{n} A_i \times B_i}{\sqrt{\sum_{i=1}^{n} (A_i)^2} \times \sqrt{\sum_{i=1}^{n} (B_i)^2}}$$

where $A_i$ and $B_i$ respectively represent components of a vector A and a vector B. The vector A is the foregoing first sample feature vector, and the vector B is the foregoing second sample feature vector.

In an exemplary solution, the performing a target correction operation on the source image, the template image, and the initial synthesized image to obtain a target residual image includes: inputting the source image into a target correction network together with the template image and the initial synthesized image, to obtain the target residual image, the target residual image being obtained from the target correction network in the following manners: performing a concatenating operation on the source image, the template image, and the initial synthesized image to obtain a second concatenated image, a quantity of channels of the second concatenated image being a sum of quantities of channels of the source image, the template image, and the initial synthesized image; performing an encoding operation on the second concatenated image to obtain second intermediate layer feature information with an increased quantity of channels; and performing a decoding operation on the second intermediate layer feature information to obtain the target residual image with a decreased quantity of channels, a quantity of channels of the target residual image being the same as the quantity of channels of the initial synthesized image.

In this embodiment of the present disclosure, the foregoing concatenating operation may include, but is not limited to, performing the feature extraction operation on the source image, the template image, and the initial synthesized image, and then superimposing extracted feature maps to obtain the foregoing second concatenated image.

For example, if the source image, the template image, and the initial synthesized image all have a quantity of channels of 3 (RGB) and dimensions of 512*512 pixels, the source image, the template image, and the initial synthesized image are concatenated to obtain a second concatenated image having 512*512*9 dimensions.

In this embodiment of the present disclosure, the foregoing encoding operation may include, but is not limited to, performing a convolution operation on the second concatenated image, and the foregoing decoding operation may include, but is not limited to, performing a deconvolution operation on the second concatenated image.

For example, the second concatenated image having an input of 512*512*9 dimensions is gradually encoded to have 256*256*18 dimensions, 128*128*32 dimensions, 64*64*64 dimensions, 32*32*128 dimensions, and so on, so as to obtain the foregoing second intermediate layer feature information and transmit the second intermediate layer feature information to the decoder. The decoder is mainly configured to perform a deconvolution operation, gradually double a resolution, and decode the second intermediate layer feature information into 32*32*128 dimensions, 64*64*64 dimensions, 128*128*32 dimensions, 256*256*16 dimensions, and 512*512*9 dimensions, and finally obtains the target residual image.

In this embodiment of the present disclosure, the foregoing first target loss value may include, but is not limited to, an overall loss value of the first synthesis network. The foregoing first loss condition may be a preset loss condition, for example, the first target loss value is less than a first preset value. In this case, the first synthesis network is determined as the target synthesis network. In response to that the first target loss value does not meet the first loss condition, a parameter of the first synthesis network is adjusted until the first target loss value meets the first loss condition.

In an exemplary solution, the foregoing method further includes: training an initial correction network to obtain a target correction network. The initial correction network is trained to obtain the target correction network in the following manners: obtaining a second sample source image, a second sample template image, a label residual image, and a second sample initial synthesized image, the second sample initial synthesized image being an image obtained through performing the target synthesis operation on the second sample source image and the second sample template image, the label residual image being determined based on the label image and the second sample initial synthesized image, and the label image being a desired predetermined image obtained through synthesizing the second sample source image with the second sample template image; performing a concatenating operation on the second sample source image, the second sample template image, and the second sample initial synthesized image to obtain a second sample concatenated image, a quantity of channels of the second sample concatenated image being a sum of quantities of channels of the second sample source image, the second sample template image, and the second sample initial synthesized image; performing an encoding operation on the second sample concatenated image to obtain second sample intermediate layer feature information with an increased quantity of channels; performing a decoding operation on the second sample intermediate layer feature information, to obtain a sample residual image with a decreased quantity of channels, the quantity of channels of the sample residual image being the same as the quantity of channels of the second sample initial synthesized image; calculating a second target loss value of the initial correction network based on the second sample source image, the label residual image, the second sample initial synthesized image, and the sample residual image; and determining the initial correction network as the target correction network in response to that the second target loss value meets a second loss condition.

In this embodiment of the present disclosure, the foregoing concatenating operation may include, but is not limited to, performing the feature extraction operation on the second sample source image, the second sample template image, and the second sample initial synthesized image, and then superimposing extracted feature maps to obtain the foregoing second sample concatenated image.

For example, if the second sample source image, the second sample template image, and the second sample initial synthesized image all have a quantity of channels of 3 (RGB) and dimensions of 512*512 pixels, the second sample source image, the second sample template image, and the second sample initial synthesized image are concatenated to obtain a second sample concatenated image having 512*512*9 dimensions.

In this embodiment of the present disclosure, the foregoing encoding operation may include, but is not limited to, performing a convolution operation on the second sample concatenated image, and the foregoing decoding operation may include, but is not limited to, performing a deconvolution operation on the second sample concatenated image.

For example, the second sample concatenated image having an input of 512*512*9 dimensions is gradually encoded to have 256*256*18 dimensions, 128*128*32 dimensions, 64*64*64 dimensions, 32*32*128 dimensions, and so on, so as to obtain the foregoing second sample intermediate layer feature information and transmit the second sample intermediate layer feature information to the decoder. The decoder is mainly configured to perform a deconvolution operation, gradually double a resolution, and decode the second sample intermediate layer feature information into 32*32*128 dimensions, 64*64*64 dimensions, 128*128*32 dimensions, 256*256*16 dimensions, and 512*512*9 dimensions, and finally obtains the sample residual image.

In this embodiment of the present disclosure, the foregoing second target loss value may include, but is not limited to, an overall loss value of the initial correction network. The foregoing second loss condition may be a preset loss condition, for example, the second target loss value is less than a second preset value. In this case, the initial correction network is determined as the target correction network. In response to that the second target loss value does not meet the second loss condition, a parameter of the initial correction network is adjusted until the second target loss value meets the second loss condition.

In this embodiment of the present disclosure, the foregoing label image is a predetermined image during training. The image is a target of a current training process, and may be manually generated in advance, for example, a GT image generated in advance through manual annotation. The foregoing label residual image is a difference image between the label image and the second sample initial synthesized image. For example, gt_diff_map (corresponding to the foregoing label residual image)=gt (corresponding to the foregoing label image)−fake1 (corresponding to the foregoing second sample initial synthesized image).

In an exemplary solution, the calculating a second target loss value of the initial correction network based on the second sample source image, the label residual image, the second sample initial synthesized image, and the sample residual image includes: calculating a third loss value based on the sample residual image and the label residual image; and determining the third loss value and a reconstruction loss value of a second synthesis network together as the second target loss value, the second synthesis network being configured to generate the second sample initial synthesized image, and the reconstruction loss value being a loss value for performing the encoding operation and the decoding operation.

In this embodiment of the present disclosure, the calculating a third loss value based on the sample residual image and the label residual image may include but is not limited to Diff_reconstruction_loss, Diff_reconstruction_loss=|gt_diff_map−diff_map|, so that a difference between the sample residual image and the label residual image is as small as possible. The diff_map represents the sample residual image.

In the embodiments of the present disclosure, an example in which the foregoing initial correction network is a GAN is used. A reconstruction loss value of the foregoing initial correction network may include but is not limited to a composition of Reconstruction_loss+D_loss+G_loss, the Reconstruction_loss corresponding to the foregoing reconstruction loss value, the G_loss being a loss value of a generator, and the foregoing D_loss being a loss value of a discriminator.

In an exemplary solution, the determining the third loss value and a reconstruction loss value of a first synthesis network together as the second target loss value includes: synthesizing the second sample initial synthesized image with the sample residual image to form a sample target synthesized image; performing a feature extraction operation on the sample target synthesized image by using a pre-trained feature extraction module, to obtain a third set of sample feature maps, the feature extraction module being configured to extract feature information of different levels, and each sample feature map of the third set of sample feature maps corresponding to feature information of one level extracted from the sample target synthesized image; performing the feature extraction operation on the label image by using the feature extraction module, to obtain a first set of sample feature maps, each sample feature map of the first set of sample feature maps corresponding to feature information of one level extracted from the label image; calculating a fourth loss value based on the third set of sample feature maps and the first set of sample feature maps, the fourth loss value being calculated from the feature information extracted from the sample target synthesized image and the feature information extracted from the label image at the corresponding levels under different levels; and determining the fourth loss value, the third loss value, and the reconstruction loss value of the second synthesis network together as the second target loss value.

In this embodiment of the present disclosure, the foregoing label image is a predetermined image during training. The image is a target of a current training process, and may be manually generated in advance, for example, a GT image generated in advance through manual annotation.

In this embodiment of the present disclosure, the foregoing feature extraction module may include but is not limited to pre-trained AlexNet, which is configured to extract features of the image at different layers and calculate a learned perceptual image patch similarity (LPIPS) loss.

Figure 9:
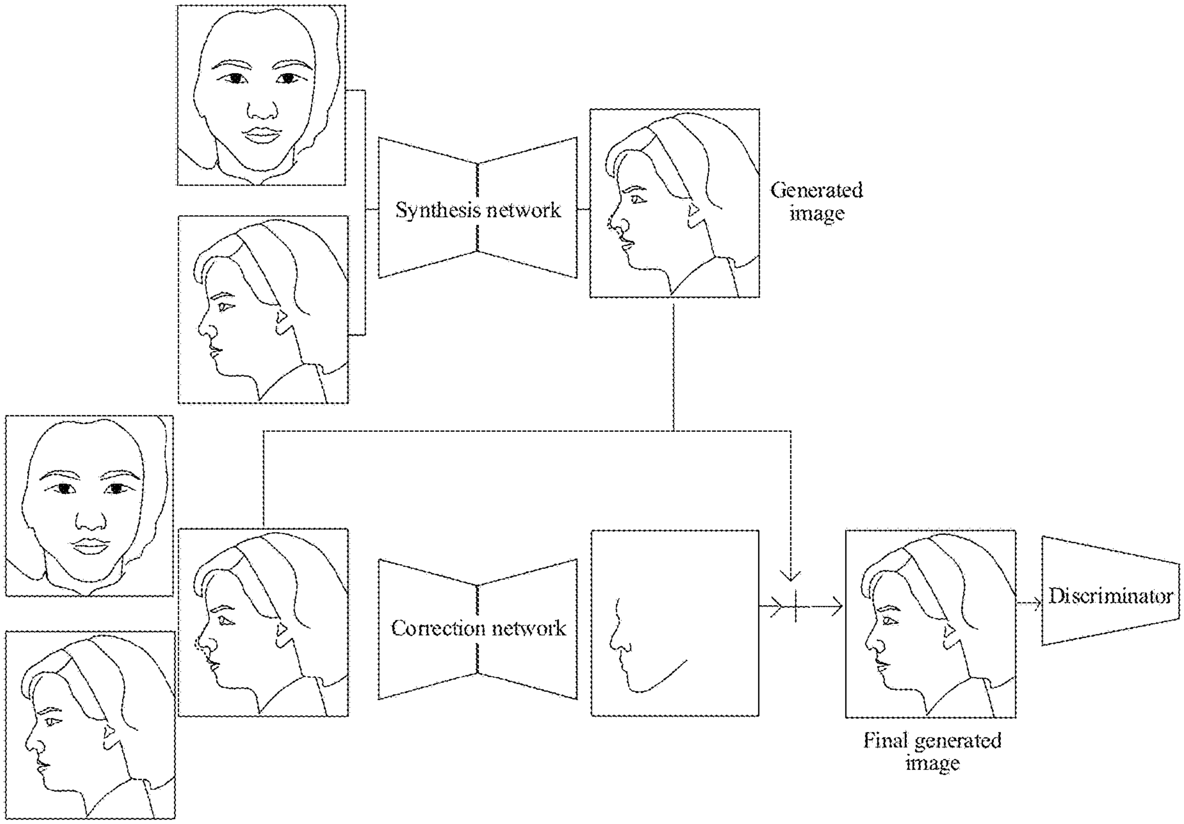
FIG. 9 is a schematic diagram of another image synthesis method according to an embodiment of the present disclosure.

As shown in FIG. 9, in a deep network model, a feature at a low level can represent a low-level feature such as a line or a color, and a feature at a high level can represent a high-level feature such as a component. Therefore, a similarity of different images may be measured through features extracted by AlexNet.

For example, a first set of sample feature maps obtained by performing the feature extraction operation on a label image may specifically include but are not limited to the following sample feature maps of 4 levels: gt_img_fea1, gt_img_fea2, gt_img_fea3, gt_img_fea4=alexnet_feature (gt). For example, the feature extraction operation is performed on a sample target synthesized image to obtain a third set of sample feature maps, which may include but are not limited to the following sample feature maps of 4 levels: result_fea1, result_fea2, result_fea3, and result_fea4=alexnet_feature (fake2).

A fourth loss value is calculated based on the first set of sample feature maps and the third set of sample feature maps through the following:

$$\text{LPIPS\_loss} = |\text{result\_fea1} - \text{gt\_img\_fea1}| + |\text{result\_fea2gt\_img\_fea2}| + |\text{result\_fea3} - \text{gt\_img\_fea3}| + |\text{result\_fea4} - \text{gt\_img\_fea4}|.$$

In an exemplary solution, the determining the third loss value and a reconstruction loss value of a first synthesis network together as the second target loss value includes: performing a recognition operation on the sample target synthesized image, to obtain a third sample feature vector, the third sample feature vector representing source image identity information in the sample target synthesized image; performing the recognition operation on the second sample source image, to obtain a fourth sample feature vector, the fourth sample feature vector representing source image identity information in the second sample source image; calculating a fifth loss value of the second synthesis network based on the third sample feature vector and the fourth sample feature vector, the second target loss value including the fifth loss value, and the fifth loss value representing a similarity between the third sample feature vector and the fourth sample feature vector; and determining the fifth loss value, the third loss value, the fourth loss value, and the reconstruction loss value of the second synthesis network together as the second target loss value.

In this embodiment of the present disclosure, the foregoing recognition operation may include, but is not limited to, being implemented by a face recognition network. The face recognition network is configured to extract a face feature, and this feature generally has 1024 dimensions. It is desirable that identity information of an image to be synthesized is as similar as possible to identity information of a source image. Therefore, the face feature is extracted to provide constraints.

For example, a recognition feature of the sample target synthesized image is extracted to obtain fake2_id_features, and a recognition feature of the second sample source image is extracted to obtain source_id_features. An ID estimation loss (corresponding to the foregoing fifth loss value) is calculated by using a cosine similarity (which may further include, but is not limited to, a Euclidean distance). Since it is desirable that the sample target synthesized image to be generated is as similar as possible to the second sample source image, ID_loss=1−cosine_similarity (fake2_id_features, source_id_features). The cosine similarity is calculated as follows:

$$\text{similarity} = \cos(\theta) = \frac{A \cdot B}{\|A\|\|B\|} = \frac{\sum_{i=1}^{n} A_i \times B_i}{\sqrt{\sum_{i=1}^{n} (A_i)^2} \times \sqrt{\sum_{i=1}^{n} (B_i)^2}}$$

where $A_i$ and $B_i$ respectively represent components of a vector A and a vector B. The vector A is the foregoing third sample feature vector, and the vector B is the foregoing fourth sample feature vector.

In an exemplary solution, before the performing a target synthesis operation on the source image and the template image to obtain an initial synthesized image, the foregoing method further includes: respectively performing object detection on the source image and the template image, to obtain an object region in the source image and an object region in the template image; performing a registration operation on the object region to determine key point information in the object region, the key point information representing an object in the object region; and respectively cropping the source image and the template image based on the key point information, to obtain the source image and the template image for performing the target synthesis operation.

In this embodiment of the present disclosure, the foregoing object detection may include, but is not limited to, preprocessing the inputted image to obtain a cropped source image and a cropped template image. An example in which the source image and the template image are both a face image is used, specifically including the following operations.

S1: A face often occupies a small position in the inputted source image and template image. Therefore, face detection needs to be performed first to obtain a target face region (corresponding to the foregoing object region).

S2: Perform face registration in the face region to obtain key points of the face, with an emphasis on the key points of eyes and corners of a mouth of a person. The face registration is an image preprocessing technology that can locate coordinates of key points of five sense organs of a face. A quantity for the key points of the five sense organs is a preset fixed value, which may be defined based on different semantic situations (generally including fixed values such as 5 points, 68 points, and 90 points).

S3: Obtain a cropped face image (corresponding to the source image and the template image for performing the target synthesis operation described above) based on the key points of the face.

In addition, two additional pre-trained models are required to assist learning of the synthesis network in the present disclosure, including but not limited to: a face recognition network and pre-trained AlexNet. The face recognition network is configured to extract a face feature. This feature generally has 1024 dimensions. It is desirable that an identity of a face (corresponding to the foregoing initial synthesized image) to be generated is as similar as possible to an identity of a face of a source (corresponding to the foregoing source image). Therefore, the face feature is extracted to provide constrains. The pre-trained AlexNet is configured to extract features of the image at different layers to calculate an LPIPS loss. In a deep network model, a feature at a low level can represent a low-level feature such as a line or a color, and a feature at a high level can represent a high-level feature such as a component. Therefore, an overall similarity may be measured by comparing the features extracted by the two images by using AlexNet.

A training process of the synthesis network in a first stage is as follows.

S11: Prepare data for face swapping, the data including a triplet including source (corresponding to the foregoing source image), template (corresponding to the foregoing template image), and gt (corresponding to the foregoing label image).

S12: Perform face swapping in the first stage. The synthesis network may be generally divided into two parts: an encoder and a decoder. The encoder continuously halves dimensions of an inputted image through convolution calculation, and gradually increases a channel. Specifically, for example, an input to the synthesis network which has 512*512*6 dimensions (the input being formed by concatenating two images together, with each image having a quantity of channels of 3 (RGB)) is gradually encoded to have 256*256*32 dimensions, 128*128*64 dimensions, 64*64*128 dimensions, 32*32*256 dimensions, and so on.

S13: Transmit a result obtained in S12 to a decoder. The decoder is mainly configured to perform a deconvolution operation, gradually double an image resolution, and decode the result obtained in S12 into 32*32*256 dimensions, 64*64*128 dimensions, 128*128*64 dimensions, 256*256*32 dimensions, and 512*512*3 dimensions, and finally obtains a fake1 image as a face swapping result.

S14: Extract a recognition feature (such as identity information, including but not limited to the face feature and features of five sense organs in the image) of the fake1 image, to obtain fake1_id_features.

S15: Extract a recognition feature (such as identity information, including but not limited to the face feature and features of five sense organs in the image) of the source image, to obtain source_id_features.

S16: Calculate a feature loss of the fake1 image as the face swapping result. The loss function is to calculate a difference between the two images (fake1 and gt) at a feature level, which is referred to as LPIPSLoss. First, network features of the fake1 image and the gt image at different layers are extracted by using the pre-trained Alexnet, and then differences between corresponding layers of the two images are compared. It is desirable that the difference between the network features of different layers of the two images is as small as possible.

In the foregoing process, the feature extraction is, for example:

result_fea1, result_fea2, result_fea3, and result_fea4=alexnet_feature (fake1); and gt_img_fea1, gt_img_fea2, gt_img_fea3, gt_img_fea4=alexnet_feature (gt).

The LPIPS is calculated as follows, for example:

$$\text{LPIPS\_loss} = |\text{result\_fea1} - \text{gt\_img\_fea1}| + |\text{result\_fea2gt\_img\_fea2}| + |\text{result\_fea3} - \text{gt\_img\_fea3}| + |\text{result\_fea4} - \text{gt\_img\_fea4}|.$$

S17: Calculate an identity information (ID) estimation loss by using the cosine similarity. It is desirable that the fake1 image to be generated is as similar as possible to the source (the identity information is as similar as possible). ID_loss=1−cosine_similarity (fake1_id_features, source_id_features). The cosine similarity is calculated as follows:

$$\text{similarity} = \cos(\theta) = \frac{A \cdot B}{\|A\|\|B\|} = \frac{\sum_{i=1}^{n} A_i \times B_i}{\sqrt{\sum_{i=1}^{n} (A_i)^2} \times \sqrt{\sum_{i=1}^{n} (B_i)^2}}$$

where $A_i$ and $B_i$ respectively represent components of a vector A and a vector B. The vector A, for example, is the foregoing fake1_id_features. The vector B is, for example, the foregoing source_id_features.

S18: Calculate an adversarial loss. The GAN in this embodiment of the present disclosure further includes a discriminator network configured to determine whether the generated synthesized image (the face swapping result) is real. The adversarial loss value includes the following content:

$$D\_\text{loss} = -\log D(gt) - \log(1 - D(\text{fake1})); \text{ and}$$

$$G\_\text{loss} = \log(1 - D(\text{fake1})).$$

S19: Optimize a parameter of the synthesis network through loss=Reconstruction_loss+LPIPS_loss+ID_loss+D_loss+G_loss in the first stage.

Training of a correction network in a second stage:

After the training of the synthesis network in the first stage is completed, the training of the correction network in the second stage is started. A structure of the correction network is, for example, similar to a structure of the synthesis network.

S21: A learning objective of the correction network is a residual image gt_diff_map (corresponding to the foregoing label residual image)=gt−fake1.

S22: Transmit the source, the template, and the fake1 image as the face swapping result in the first stage into the correction network as inputs.

S23: Similar to the description of the synthesis network in S12 and S13, the correction network may also be a structure including an encoder and a decoder, but an output of the correction network is a residual image diff_map.

S24: Obtain fake2=fake1+diff_map as a final face swapping result, the fake2 image being a result of correction of the fake1 image through correction of the residual image diff_map.

S25: A newly increased reconstruction loss of the residual image in the correction network is a difference between the label residual image and the sample residual image, the difference between the label residual image and the sample residual image being as small as possible. Diff_reconstruction_loss=|gt_diff_map−diff_map|.

S26: Replace the input fake1 image with the fake2 image to calculate another loss function of the correction network that may be similar to the loss function of the synthesis network in the first stage.

S27: Obtain loss=Diff_reconstruction_loss+Reconstruction_loss+LPIPS_loss+ID_loss+D_loss+G_loss as a final loss function in the second stage, so as to facilitate optimization of model parameters.

In an exemplary embodiment, the method may include but is not limited to the following exemplary operations.

S31: Test any source image and any template image, and transmit the images to the synthesis network, to obtain fake1.

S32: Transmit the source image, the template image, and the fake1 image into the correction network to obtain diff_map.

S33: Obtain fake2=fake1+diff_map as a final face swapping result.

A specific application process includes the following operations:

(1) video acquisition→(2) image input→(3) face detection→(4) cropping of a face region→(5) face swapping in 2 stages→(6) result display.

(5) is a module that needs to be trained during actual use of the method of this technology to cooperate and interact with another module. First, the image input needs to be received from a video acquisition module, then the face detection is performed, and the face region is cropped. Then, the method of this technology is performed to perform face swapping. Finally, a result is displayed.

According to the embodiments of the present disclosure, face ghosting can be eliminated in a large pose to maintain a relatively good effect of the synthesized image, and a stable face swapping effect of the video can still be maintained in a case of occlusion.

A specific implementation of the present disclosure relates to relevant data such as user information. When the foregoing embodiment of the present disclosure is applied to a specific product or technology, a user permission or consent needs to be obtained, and collection, use, and processing of the relevant data need to comply with relevant laws, regulations, and standards of relevant countries and regions.

To simplify the description, the foregoing method embodiments are described as a series of action combination, but a person of ordinary skill in the art is to know that the present disclosure is not limited to any described sequence of the action, because some operations may be performed in another sequence or simultaneously according to the present disclosure. In addition, a person skilled in the art also needs to know that the embodiments described in the specification are all preferred embodiments, and the involved actions and modules are not necessary for the present disclosure. In addition, the descriptions of all of the embodiments of the present disclosure may complement and combine with each other.

Figure 10:
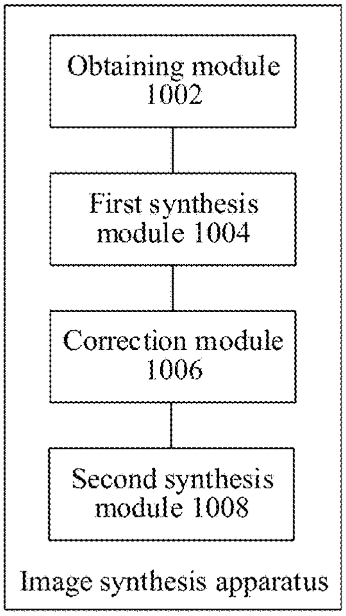
FIG. 10 is a schematic structural diagram of an image synthesis apparatus according to an embodiment of the present disclosure.

According to another aspect of the embodiments of the present disclosure, an image synthesis apparatus for implementing the foregoing image synthesis method is further provided. As shown in FIG. 10, the apparatus includes the following modules:

an obtaining module 1002, configured to obtain a source image and a template image to be processed, the source image including source image identity information for synthesis, and the template image including template image background information for synthesis, a target object in the template image having a target pose or the target object being occluded;

a first synthesis module 1004, configured to perform a target synthesis operation on the source image and the template image to obtain an initial synthesized image, the initial synthesized image including the source image identity information, the template image background information, and a partial region to be corrected;

a correction module 1006, configured to perform a target correction operation on the source image, the template image, and the initial synthesized image to obtain a target residual image, the target residual image being configured to correct the partial region; and a second synthesis module 1008, configured to synthesize the initial synthesized image with the target residual image to form a target synthesized image, the target synthesized image including the source image identity information, the template image background information, and the partial region corrected based on the target residual image.

In an exemplary solution, the apparatus is configured to perform the target synthesis operation on the source image and the template image to obtain the initial synthesized image in the following manners: inputting the source image into a target synthesis network together with the template image, to obtain the initial synthesized image, the initial synthesized image being obtained from the target synthesis network in the following manners: performing a concatenating operation on the source image and the template image to obtain a first concatenated image, a quantity of channels of the first concatenated image being a sum of quantities of channels of the source image and the template image; performing an encoding operation on the first concatenated image to obtain first intermediate layer feature information with an increased quantity of channels; and performing a decoding operation on the first intermediate layer feature information to obtain the initial synthesized image with a decreased quantity of channels, a quantity of channels of the initial synthesized image being the same as the quantity of channels of the source image.

In an exemplary solution, the apparatus is further configured to: train a first synthesis network to obtain the target synthesis network, the first synthesis network being trained to obtain the target synthesis network in the following manners: obtaining a first sample source image, a first sample template image, and a label image, the label image being a desired predetermined image obtained through synthesizing the first sample source image with the first sample template image; performing a concatenating operation on the first sample source image and the first sample template image to obtain a first sample concatenated image, a quantity of channels of the first sample concatenated image being a sum of quantities of channels of the first sample source image and the first sample template image; performing an encoding operation on the first sample concatenated image through the first synthesis network, to obtain first sample intermediate layer feature information with an increased quantity of channels; performing a decoding operation on the first sample intermediate layer feature information through the first synthesis network, to obtain a first sample initial synthesized image with a decreased quantity of channels, a quantity of channels of the first sample initial synthesized image being the same as a quantity of channels of the first sample source image; calculating a first target loss value of the first synthesis network based on the first sample initial synthesized image, the first sample source image, and the label image; and determining the first synthesis network as the target synthesis network in response to that the first target loss value meets a first loss condition.

In an exemplary solution, the apparatus is configured to calculate the first target loss value of the first synthesis network based on the first sample initial synthesized image, the first sample source image, and the label image in the following manners, including: performing a feature extraction operation on the label image by using a pre-trained feature extraction module, to extract feature information of different levels of the label image and obtain a first set of sample feature maps, each sample feature map of the first set of sample feature maps corresponding to feature information of one level extracted from the label image; performing the feature extraction operation on the first sample initial synthesized image by using the feature extraction module, to extract feature information of different levels of the first sample initial synthesized image and obtain a second set of sample feature maps, each sample feature map of the second set of sample feature maps corresponding to feature information of one level extracted from the first sample initial synthesized image; calculating a first loss value based on the first set of sample feature maps and the second set of sample feature maps, the first loss value being calculated from the feature information of each of the different levels extracted from the label image and the feature information of each of the different levels extracted from the first sample initial synthesized image; and determining the first loss value and a reconstruction loss value of the first synthesis network together as the first target loss value, the reconstruction loss value being a loss value for performing the encoding operation and the decoding operation.

In an exemplary solution, the apparatus is configured to calculate the first target loss value of the first synthesis network based on the first sample initial synthesized image, the first sample source image, and the label image in the following manners: performing a recognition operation on the first sample initial synthesized image, to obtain a first sample feature vector, the first sample feature vector representing source image identity information in the first sample initial synthesized image; performing the recognition operation on the first sample source image, to obtain a second sample feature vector, the second sample feature vector representing source image identity information in the first sample source image; calculating a second loss value based on the first sample feature vector and the second sample feature vector, the second loss value representing a similarity between the first sample feature vector and the second sample feature vector; and determining the second loss value and a reconstruction loss value of the first synthesis network together as the first target loss value, the reconstruction loss value being a loss value for performing the encoding operation and the decoding operation.

In an exemplary solution, the apparatus is configured to perform a target correction operation on the source image, the template image, and the initial synthesized image to obtain a target residual image in the following manners: inputting the source image into a target correction network together with the template image and the initial synthesized image, to obtain the target residual image, the target residual image being obtained from the target correction network in the following manners: performing a concatenating operation on the source image, the template image, and the initial synthesized image to obtain a second concatenated image, a quantity of channels of the second concatenated image being a sum of quantities of channels of the source image, the template image, and the initial synthesized image; performing an encoding operation on the second concatenated image to obtain second intermediate layer feature information with an increased quantity of channels; and performing a decoding operation on the second intermediate layer feature information to obtain the target residual image with a decreased quantity of channels, a quantity of channels of the target residual image being the same as the quantity of channels of the initial synthesized image.

In an exemplary solution, the apparatus is further configured to: train an initial correction network to obtain the target correction network, the initial correction network being trained to obtain the target correction network in the following manners: obtaining a second sample source image, a second sample template image, a label residual image, and a second sample initial synthesized image, the second sample initial synthesized image being an image obtained through performing the target synthesis operation on the second sample source image and the second sample template image, the label residual image being determined based on the label image and the second sample initial synthesized image, and the label image being a desired predetermined image obtained through synthesizing the second sample source image with the second sample template image; performing a concatenating operation on the second sample source image, the second sample template image, and the second sample initial synthesized image to obtain a second sample concatenated image, a quantity of channels of the second sample concatenated image being a sum of quantities of channels of the second sample source image, the second sample template image, and the second sample initial synthesized image; performing an encoding operation on the second sample concatenated image to obtain second sample intermediate layer feature information with an increased quantity of channels; performing a decoding operation on the second sample intermediate layer feature information, to obtain a sample residual image with a decreased quantity of channels, the quantity of channels of the sample residual image being the same as the quantity of channels of the second sample initial synthesized image; calculating a second target loss value of the initial correction network based on the second sample source image, the label residual image, the second sample initial synthesized image, and the sample residual image; and determining the initial correction network as the target correction network in response to that the second target loss value meets a second loss condition.

In an exemplary solution, the apparatus is configured to calculate a second target loss value of the initial correction network based on the second sample source image, the label residual image, the second sample initial synthesized image, and the sample residual image in the following manners: calculating a third loss value based on the sample residual image and the label residual image; and determining the third loss value and a reconstruction loss value of a second synthesis network together as the second target loss value, the second synthesis network being configured to generate the second sample initial synthesized image, and the reconstruction loss value being a loss value for performing the encoding operation and the decoding operation.

In an exemplary solution, the apparatus is configured to determine the third loss value and the reconstruction loss value of the first synthesis network together as the second target loss value in the following manners: synthesizing the second sample initial synthesized image with the sample residual image to form a sample target synthesized image; performing a feature extraction operation on the sample target synthesized image by using a pre-trained feature extraction module, to obtain a third set of sample feature maps, the feature extraction module being configured to extract feature information of different levels, and each sample feature map of the third set of sample feature maps corresponding to feature information of one level extracted from the sample target synthesized image; performing the feature extraction operation on the label image by using the feature extraction module, to obtain a first set of sample feature maps, each sample feature map of the first set of sample feature maps corresponding to feature information of one level extracted from the label image; calculating a fourth loss value based on the third set of sample feature maps and the first set of sample feature maps, the fourth loss value being calculated from the feature information extracted from the sample target synthesized image and the feature information extracted from the label image at the corresponding levels under different levels; and determining the fourth loss value, the third loss value, and the reconstruction loss value of the second synthesis network together as the second target loss value.

In an exemplary solution, the apparatus is configured to determine the third loss value and the reconstruction loss value of the first synthesis network together as the second target loss value in the following manners: performing a recognition operation on the sample target synthesized image, to obtain a third sample feature vector, the third sample feature vector representing source image identity information in the sample target synthesized image; performing the recognition operation on the second sample source image, to obtain a fourth sample feature vector, the fourth sample feature vector representing source image identity information in the second sample source image; calculating a fifth loss value of the second synthesis network based on the third sample feature vector and the fourth sample feature vector, the second target loss value including the fifth loss value, and the fifth loss value representing a similarity between the third sample feature vector and the fourth sample feature vector; and determining the fifth loss value, the third loss value, the fourth loss value, and the reconstruction loss value of the second synthesis network together as the second target loss value.

In an exemplary solution, the apparatus is further configured to: respectively perform object detection on the source image and the template image to obtain an object region in the source image and an object region in the template image before performing the target synthesis operation on the source image and the template image to obtain the initial synthesized image; perform a registration operation on the object region to determine key point information in the object region, the key point information representing an object in the object region; and respectively crop the source image and the template image based on the key point information, to obtain the source image and the template image for performing the target synthesis operation.

Figure 11:
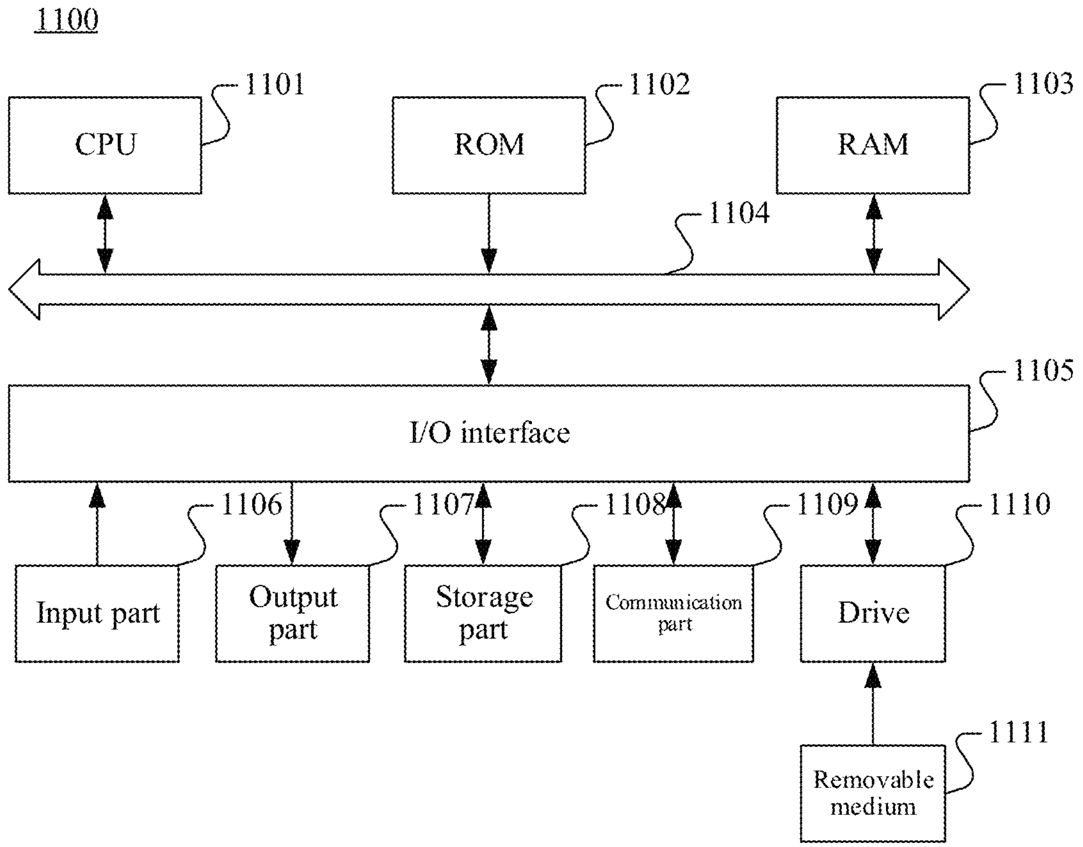
FIG. 11 is a schematic structural diagram of an image synthesis product according to an embodiment of the present disclosure.

FIG. 11 is a structural block diagram schematically showing a computer system of an electronic device for implementing an embodiment of the present disclosure.

The computer system 1100 of the electronic device shown in FIG. 11 is merely an example, and does not constitute any limitation on functions and usage scope of the embodiments of the present disclosure.

As shown in FIG. 11, the computer system 1100 includes a central processing unit (CPU) 1101, which may perform various suitable actions and processing based on a program stored in a read-only memory (ROM) 1102 or a program loaded from a storage part 1108 into a random access memory (RAM) 1103. The RAM 1103 further has various programs and data required for system operation stored therein. The CPU 1101, the ROM 1102, and the RAM 1103 are connected to each other through a bus 1104. An input/output interface (I/O interface) 1105 is also connected to the bus 1104.

The following components are connected to the I/O interface 1105: an input part 1106 including a keyboard, a mouse, or the like; an output part 1107 including a cathode ray tube (CRT), a liquid crystal display (LCD), a speaker, or the like; the storage part 1108 including a hard disk, or the like; and a communication part 1109 including a network interface card such as a local area network (LAN) card and a modem. The communication part 1109 performs communication processing by using a network such as the Internet. A drive 1110 is also connected to the I/O interface 1105 as required. A removable medium 1111 such as a magnetic disk, an optical disk, a magneto-optical disk, or a semiconductor memory is installed on the drive 1110 as required, so that a computer program read from the removable medium is installed into the storage part 1108 as required.

Particularly, according to the embodiments of the present disclosure, the process described in each method flowchart may be implemented as a computer software program. For example, this embodiment of the present disclosure includes a computer program product, the computer program product including a computer program carried on a computer-readable medium, the computer program including program code for performing the methods shown in the flowcharts. In such an embodiment, the computer program may be downloaded from a network through the communication part 1109 and installed, and/or installed from the removable medium 1111. When the computer program is executed by the CPU 1101, various functions defined in the system of the present disclosure are executed.

Figure 12:
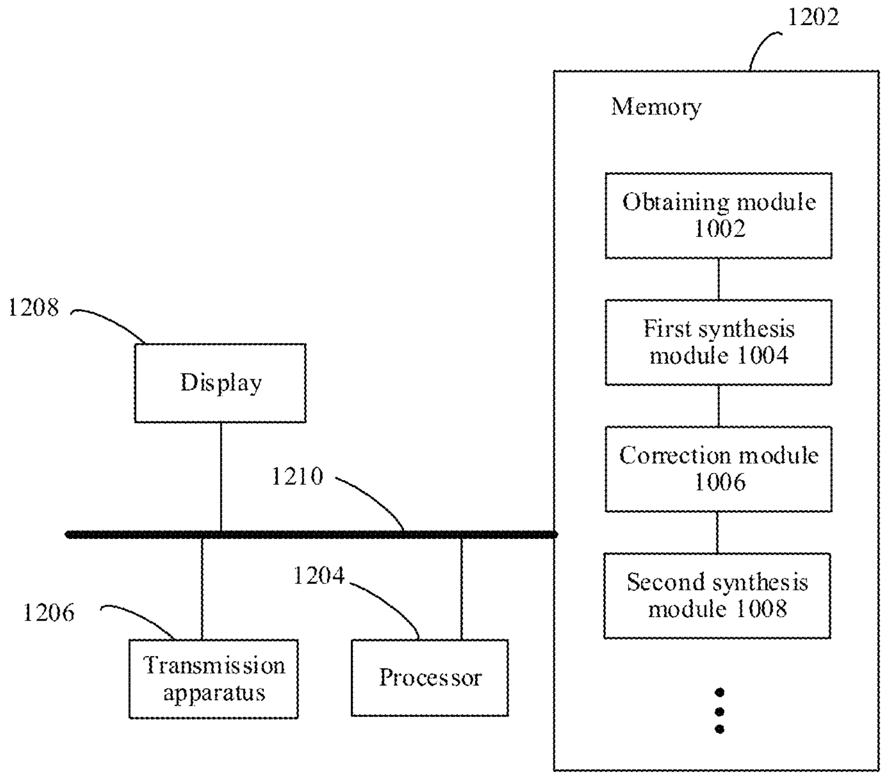
FIG. 12 is a schematic structural diagram of an electronic device according to an embodiment of the present disclosure.

According to still another aspect of the embodiments of the present disclosure, an electronic device for implementing the image synthesis method is further provided. The electronic device may be the terminal device or the server shown in FIG. 1. In this embodiment of the present disclosure, an example in which the electronic device is a terminal device is used for description. As shown in FIG. 12, the electronic device includes a memory 1202 and a processor 1204. The memory 1202 has a computer program stored therein. The processor 1204 is configured to perform the operations in any one of the foregoing method embodiments through the computer program.

In this embodiment of the present disclosure, the foregoing electronic device may be located in at least one of a plurality of network devices in a computer network.

In this embodiment of the present disclosure, the foregoing processor may be configured to perform the following operations through the computer program:

obtaining a source image and a template image to be processed, the source image including source image identity information for synthesis, and the template image including template image background information for synthesis;

performing a target synthesis operation on the source image and the template image to obtain an initial synthesized image, the initial synthesized image including the source image identity information, the template image background information, and a partial region to be corrected;

performing a target correction operation on the source image, the template image, and the initial synthesized image to obtain a target residual image; and synthesizing the initial synthesized image with the target residual image to form a target synthesized image, the target synthesized image including the source image identity information, the template image background information, and the partial region corrected based on the target residual image.

The structure shown in FIG. 12 is merely an example. The electronic device may also be a terminal device such as a smartphone (such as an Android mobile phone or an iOS mobile phone), a tablet computer, a palm computer, a mobile Internet device (MID), or a PAD. A structure of the foregoing electronic device is not limited in FIG. 12. For example, the electronic device may further include more or fewer components (for example, a network interface) than those shown in FIG. 12, or has a configuration different from that shown in FIG. 12.

The memory 1202 may be configured to store a software program and a module, for example, program instructions/modules corresponding to the image synthesis method and apparatus in the embodiments of the present disclosure, and the processor 1204 performs various functional applications and data processing by running the software program and the module stored in the memory 1202, so as to implement the foregoing image synthesis method. The memory 1202 may include a high-speed random memory, and may further include a non-volatile memory, such as one or more magnetic storage apparatuses, a flash memory, or another non-volatile solid-state memory. In some embodiments, the memory 1202 may further include memories remotely arranged relative to the processor 1204, and the remote memories may be connected to a terminal through a network. Examples of the foregoing network include, but are not limited to, the Internet, an intranet, a local area network, a mobile communication network, and a combination thereof. The memory 1202 may specifically be, but is not limited to, being configured to store information such as a synthesized image. In an example, as shown in FIG. 12, the foregoing memory 1202 may include, but is not limited to, the obtaining module 1002, the first synthesis module 1004, the correction module 1006, and the second synthesis module 1008 in the foregoing image synthesis apparatus. In addition, the memory may further include, but is not limited to, another module unit in the foregoing image synthesis apparatus. Details are not described again in this example.

A transmission apparatus 1206 is configured to receive or transmit data through a network. A specific example of the foregoing network may include a wired network and a wireless network. In an example, the transmission apparatus 1206 includes a network interface controller (NIC), which may be connected to another network device and a router through a network cable to communicate with the Internet or a local area network. In an example, the transmission apparatus 1206 is a radio frequency (RF) module, which is configured to communicate with the Internet in a wireless manner.

In addition, the foregoing electronic device further includes: a display 1208, configured to display the foregoing target synthesized image; and a connection bus 1210, configured to connect various module components in the foregoing electronic device.

In another embodiment, the foregoing terminal device or the server may be a node in a distributed system. The distributed system may be a blockchain system. The blockchain system may be a distributed system formed through connection of a plurality of nodes in the form of network communication. A peer-to-peer (P2P) network may be formed between the nodes. Any form of computing device, such as an electronic device including a server and a terminal, may become a node in the blockchain system by joining the P2P network.

According to an aspect of the present disclosure, a computer-readable storage medium is provided. A processor of a computer device reads a computer instruction from the computer-readable storage medium. The processor executes the computer instruction, causing the computer device to perform the image synthesis method provided in various exemplary implementations of the foregoing image synthesis aspects.

In the embodiments of the present disclosure, all or some operations in the methods in the foregoing embodiments may be performed by a program instructing related hardware of a terminal device. The program may be stored in the computer-readable storage medium. The storage medium may include a flash drive, a ROM, a RAM, a magnetic disk, an optical disk, or the like.

The sequence numbers of the foregoing embodiments of the present disclosure are merely for description, and do not represent the preference of the embodiments.

When the integrated unit in the foregoing embodiment is implemented in the form of a software function unit and sold or used as an independent product, the integrated unit may be stored in the foregoing computer-readable storage medium. Based on such an understanding, the technical solutions of the present disclosure essentially, or the part contributing to the prior art, or all or a part of the technical solutions may be implemented in the form of a software product. The computer software product is stored in a storage medium, and includes several instructions for enabling one or more computer devices (which may be a personal computer, a server, a network device, or the like) to perform all or a part of the operations of the method described in the embodiments of the present disclosure.

In the foregoing embodiments of the present disclosure, the descriptions of the embodiments have respective emphasis. For a part not described in detail in an embodiment, reference may be made to related descriptions of other embodiments.

In the several embodiments provided in the present disclosure, the disclosed client may be implemented in another manner. The apparatus embodiment described above is merely an example. For example, division of the units is merely division of logical functions, and may be another division during actual implementation. For example, a plurality of units or components may be combined or may be integrated into another system, or some features may be ignored or not performed. In addition, the displayed or discussed mutual coupling or direct coupling or communication connection may be implemented through some interfaces. The indirect coupling or communication connection between the units or modules may be implemented in electrical or other forms.

The units described as separate components may or may not be physically separated, and the components displayed as units may or may not be physical units, and may be located in one place or may be distributed on a plurality of network units. Some or all of the units may be selected based on an actual requirement to implement the objectives of the solutions in embodiments of the present disclosure.

In addition, functional units in the embodiments of the present disclosure may be integrated into one processing unit, each of the units may exist alone physically, or two or more units may be integrated into one unit. The integrated unit may be implemented in the form of hardware, or may be implemented in the form of a software function unit.

The foregoing descriptions are merely preferred implementations of the present disclosure. A person of ordinary skill in the art may further make several improvements and modifications without departing from the principle of the present disclosure, and these improvements and modifications also fall within the protection scope of the present disclosure.

What is claimed is:

1. An image synthesis method, comprising:

obtaining a source image and a template image to be processed, the source image comprising source image identity information for synthesis, and the template image comprising template image background information for synthesis;

performing a target synthesis operation on the source image and the template image to obtain an initial synthesized image, the initial synthesized image comprising the source image identity information, the template image background information, and a partial region to be corrected;

performing a target correction operation on the source image, the template image, and the initial synthesized image to obtain a target residual image; and synthesizing the initial synthesized image with the target residual image to generate a target synthesized image, the target synthesized image comprising the source image identity information, the template image background information, and the partial region corrected based on the target residual image.

2. The method according to claim 1, wherein the performing a target synthesis operation on the source image and the template image to obtain an initial synthesized image comprises: inputting the source image, together with the template image, into a target synthesis network, to obtain the initial synthesized image by:

performing a concatenating operation on the source image and the template image to obtain a first concatenated image, a quantity of channels of the first concatenated image being a sum of quantities of channels of the source image and the template image;

performing an encoding operation on the first concatenated image to obtain first intermediate layer feature information with an increased quantity of channels; and performing a decoding operation on the first intermediate layer feature information to obtain the initial synthesized image with a decreased quantity of channels, a quantity of channels of the initial synthesized image being the same as the quantity of channels of the source image.

3. The method according to claim 2, further comprising: training a first synthesis network to obtain the target synthesis network by:

obtaining a first sample source image, a first sample template image, and a label image, the label image being a desired predetermined image obtained through synthesizing the first sample source image with the first sample template image;

performing a concatenating operation on the first sample source image and the first sample template image to obtain a first sample concatenated image, a quantity of channels of the first sample concatenated image being a sum of quantities of channels of the first sample source image and the first sample template image;

performing an encoding operation on the first sample concatenated image through the first synthesis network, to obtain first sample intermediate layer feature information with an increased quantity of channels;

performing a decoding operation on the first sample intermediate layer feature information through the first synthesis network, to obtain a first sample initial synthesized image with a decreased quantity of channels, a quantity of channels of the first sample initial synthesized image being the same as a quantity of channels of the first sample source image;

calculating a first target loss value of the first synthesis network based on the first sample initial synthesized image, the first sample source image, and the label image; and determining the first synthesis network as the target synthesis network in response to that the first target loss value meets a first loss condition.

4. The method according to claim 3, wherein the calculating a first target loss value of the first synthesis network based on the first sample initial synthesized image, the first sample source image, and the label image comprises:

performing a feature extraction operation on the label image, to extract feature information of different levels of the label image and obtain a first set of sample feature maps, a sample feature map of the first set of sample feature maps corresponding to feature information of one level extracted from the label image;

performing the feature extraction operation on the first sample initial synthesized image, to extract feature information of different levels of the first sample initial synthesized image and obtain a second set of sample feature maps, a sample feature map of the second set of sample feature maps corresponding to feature information of one level extracted from the first sample initial synthesized image;

calculating a first loss value based on the first set of sample feature maps and the second set of sample feature maps, the first loss value being calculated from the feature information of the different levels extracted from the label image and the feature information of the different levels extracted from the first sample initial synthesized image; and determining the first loss value and a reconstruction loss value of the first synthesis network together as the first target loss value, the reconstruction loss value being a loss value for performing the encoding operation and the decoding operation.

5. The method according to claim 3, wherein the calculating a first target loss value of the first synthesis network based on the first sample initial synthesized image, the first sample source image, and the label image comprises:

performing a recognition operation on the first sample initial synthesized image, to obtain a first sample feature vector, the first sample feature vector representing source image identity information in the first sample initial synthesized image;

performing the recognition operation on the first sample source image, to obtain a second sample feature vector, the second sample feature vector representing source image identity information in the first sample source image;

calculating a second loss value based on the first sample feature vector and the second sample feature vector, the second loss value representing a similarity between the first sample feature vector and the second sample feature vector; and determining the second loss value and a reconstruction loss value of the first synthesis network together as the first target loss value, the reconstruction loss value being a loss value for performing the encoding operation and the decoding operation.

6. The method according to claim 1, wherein the performing a target correction operation on the source image, the template image, and the initial synthesized image to obtain a target residual image comprises: inputting the source image, together with the template image and the initial synthesized image, into a target correction network, to obtain the target residual image by:

performing a concatenating operation on the source image, the template image, and the initial synthesized image to obtain a second concatenated image, a quantity of channels of the second concatenated image being a sum of quantities of channels of the source image, the template image, and the initial synthesized image;

performing an encoding operation on the second concatenated image to obtain second intermediate layer feature information with an increased quantity of channels; and performing a decoding operation on the second intermediate layer feature information to obtain the target residual image with a decreased quantity of channels, a quantity of channels of the target residual image being the same as a quantity of channels of the initial synthesized image.

7. The method according to claim 6, further comprising:

training an initial correction network to obtain the target correction network, the initial correction network being trained to obtain the target correction network by:

obtaining a second sample source image, a second sample template image, a label residual image, and a second sample initial synthesized image, the second sample initial synthesized image being an image obtained through performing the target synthesis operation on the second sample source image and the second sample template image, the label residual image being determined based on the label image and the second sample initial synthesized image, and the label image being a desired predetermined image obtained through synthesizing the second sample source image with the second sample template image;

performing a concatenating operation on the second sample source image, the second sample template image, and the second sample initial synthesized image to obtain a second sample concatenated image, a quantity of channels of the second sample concatenated image being a sum of quantities of channels of the second sample source image, the second sample template image, and the second sample initial synthesized image;

performing an encoding operation on the second sample concatenated image to obtain second sample intermediate layer feature information with an increased quantity of channels;

performing a decoding operation on the second sample intermediate layer feature information, to obtain a sample residual image with a decreased quantity of channels, a quantity of channels of the sample residual image being the same as the quantity of channels of the second sample initial synthesized image;

calculating a second target loss value of the initial correction network based on the second sample source image, the label residual image, the second sample initial synthesized image, and the sample residual image; and determining the initial correction network as the target correction network in response to that the second target loss value meets a second loss condition.

8. The method according to claim 7, wherein the calculating a second target loss value of the initial correction network based on the second sample source image, the label residual image, the second sample initial synthesized image, and the sample residual image comprises:

calculating a third loss value based on the sample residual image and the label residual image; and determining the third loss value and a reconstruction loss value of a second synthesis network together as the second target loss value, the second synthesis network being configured to generate the second sample initial synthesized image, and the reconstruction loss value being a loss value for performing the encoding operation and the decoding operation.

9. The method according to claim 8, wherein the determining the third loss value and a reconstruction loss value of a first synthesis network together as the second target loss value comprises:

synthesizing the second sample initial synthesized image with the sample residual image to form a sample target synthesized image;

performing a feature extraction operation on the sample target synthesized image, to obtain a third set of sample feature maps, the feature extraction module being configured to extract feature information of different levels, and a sample feature map of the third set of sample feature maps corresponding to feature information of one level extracted from the sample target synthesized image;

performing the feature extraction operation on the label image, to obtain a first set of sample feature maps, a sample feature map of the first set of sample feature maps corresponding to feature information of one level extracted from the label image;

calculating a fourth loss value based on the third set of sample feature maps and the first set of sample feature maps, the fourth loss value being calculated from the feature information extracted from the sample target synthesized image and the feature information extracted from the label image at the corresponding levels under different levels; and determining the fourth loss value, the third loss value, and the reconstruction loss value of the second synthesis network together as the second target loss value.

10. The method according to claim 9, wherein the determining the third loss value and a reconstruction loss value of a first synthesis network together as the second target loss value comprises:

performing a recognition operation on the sample target synthesized image, to obtain a third sample feature vector, the third sample feature vector representing source image identity information in the sample target synthesized image;

performing the recognition operation on the second sample source image, to obtain a fourth sample feature vector, the fourth sample feature vector representing source image identity information in the second sample source image;

calculating a fifth loss value of the second synthesis network based on the third sample feature vector and the fourth sample feature vector, the second target loss value comprising the fifth loss value, and the fifth loss value representing a similarity between the third sample feature vector and the fourth sample feature vector; and determining the fifth loss value, the third loss value, the fourth loss value, and the reconstruction loss value of the second synthesis network together as the second target loss value.

11. The method according to claim 1, wherein the method further comprises:

respectively performing object detection on the source image and the template image, to obtain an object region in the source image and an object region in the template image;

performing a registration operation on the object region to determine key point information in the object region, the key point information representing an object in the object region; and respectively cropping the source image and the template image based on the key point information, to obtain the source image and the template image for performing the target synthesis operation.

12. An image synthesis apparatus, comprising:

at least one memory and at least one processor, the at least one memory having a computer program stored therein, the at least one processor being configured to execute the computer program and perform:

obtaining a source image and a template image to be processed, the source image comprising source image identity information for synthesis, and the template image comprising template image background information for synthesis;

performing a target synthesis operation on the source image and the template image to obtain an initial synthesized image, the initial synthesized image comprising the source image identity information, the template image background information, and a partial region to be corrected;

performing a target correction operation on the source image, the template image, and the initial synthesized image to obtain a target residual image; and synthesizing the initial synthesized image with the target residual image to generate a target synthesized image, the target synthesized image comprising the source image identity information, the template image background information, and the partial region corrected based on the target residual image.

13. The apparatus according to claim 12, wherein the performing a target synthesis operation on the source image and the template image to obtain an initial synthesized image comprises: inputting the source image, together with the template image, into a target synthesis network, to obtain the initial synthesized image by:

performing a concatenating operation on the source image and the template image to obtain a first concatenated image, a quantity of channels of the first concatenated image being a sum of quantities of channels of the source image and the template image;

performing an encoding operation on the first concatenated image to obtain first intermediate layer feature information with an increased quantity of channels; and performing a decoding operation on the first intermediate layer feature information to obtain the initial synthesized image with a decreased quantity of channels, a quantity of channels of the initial synthesized image being the same as the quantity of channels of the source image.

14. The apparatus according to claim 13, wherein the at least one processor is further configured to train a first synthesis network to obtain the target synthesis network by:

obtaining a first sample source image, a first sample template image, and a label image, the label image being a desired predetermined image obtained through synthesizing the first sample source image with the first sample template image;

performing a concatenating operation on the first sample source image and the first sample template image to obtain a first sample concatenated image, a quantity of channels of the first sample concatenated image being a sum of quantities of channels of the first sample source image and the first sample template image;

performing an encoding operation on the first sample concatenated image through the first synthesis network, to obtain first sample intermediate layer feature information with an increased quantity of channels;

performing a decoding operation on the first sample intermediate layer feature information through the first synthesis network, to obtain a first sample initial synthesized image with a decreased quantity of channels, a quantity of channels of the first sample initial synthesized image being the same as a quantity of channels of the first sample source image;

calculating a first target loss value of the first synthesis network based on the first sample initial synthesized image, the first sample source image, and the label image; and determining the first synthesis network as the target synthesis network in response to that the first target loss value meets a first loss condition.

15. The apparatus according to claim 14, wherein the calculating a first target loss value of the first synthesis network based on the first sample initial synthesized image, the first sample source image, and the label image comprises:

performing a feature extraction operation on the label image, to extract feature information of different levels of the label image and obtain a first set of sample feature maps, a sample feature map of the first set of sample feature maps corresponding to feature information of one level extracted from the label image;

performing the feature extraction operation on the first sample initial synthesized image, to extract feature information of different levels of the first sample initial synthesized image and obtain a second set of sample feature maps, a sample feature map of the second set of sample feature maps corresponding to feature information of one level extracted from the first sample initial synthesized image;

calculating a first loss value based on the first set of sample feature maps and the second set of sample feature maps, the first loss value being calculated from the feature information of the different levels extracted from the label image and the feature information of the different levels extracted from the first sample initial synthesized image; and determining the first loss value and a reconstruction loss value of the first synthesis network together as the first target loss value, the reconstruction loss value being a loss value for performing the encoding operation and the decoding operation.

16. The apparatus according to claim 14, wherein the calculating a first target loss value of the first synthesis network based on the first sample initial synthesized image, the first sample source image, and the label image comprises:

performing a recognition operation on the first sample initial synthesized image, to obtain a first sample feature vector, the first sample feature vector representing source image identity information in the first sample initial synthesized image;

performing the recognition operation on the first sample source image, to obtain a second sample feature vector, the second sample feature vector representing source image identity information in the first sample source image;

calculating a second loss value based on the first sample feature vector and the second sample feature vector, the second loss value representing a similarity between the first sample feature vector and the second sample feature vector; and determining the second loss value and a reconstruction loss value of the first synthesis network together as the first target loss value, the reconstruction loss value being a loss value for performing the encoding operation and the decoding operation.

17. The apparatus according to claim 12, wherein the performing a target correction operation on the source image, the template image, and the initial synthesized image to obtain a target residual image comprises: inputting the source image, together with the template image and the initial synthesized image, into a target correction network, to obtain the target residual image by:

performing a concatenating operation on the source image, the template image, and the initial synthesized image to obtain a second concatenated image, a quantity of channels of the second concatenated image being a sum of quantities of channels of the source image, the template image, and the initial synthesized image;

performing an encoding operation on the second concatenated image to obtain second intermediate layer feature information with an increased quantity of channels; and performing a decoding operation on the second intermediate layer feature information to obtain the target residual image with a decreased quantity of channels, a quantity of channels of the target residual image being the same as a quantity of channels of the initial synthesized image.

18. The apparatus according to claim 17, wherein the at least one processor is further configured to train an initial correction network to obtain the target correction network, the initial correction network being trained to obtain the target correction network by:

obtaining a second sample source image, a second sample template image, a label residual image, and a second sample initial synthesized image, the second sample initial synthesized image being an image obtained through performing the target synthesis operation on the second sample source image and the second sample template image, the label residual image being determined based on the label image and the second sample initial synthesized image, and the label image being a desired predetermined image obtained through synthesizing the second sample source image with the second sample template image;

performing a concatenating operation on the second sample source image, the second sample template image, and the second sample initial synthesized image to obtain a second sample concatenated image, a quantity of channels of the second sample concatenated image being a sum of quantities of channels of the second sample source image, the second sample template image, and the second sample initial synthesized image;

performing an encoding operation on the second sample concatenated image to obtain second sample intermediate layer feature information with an increased quantity of channels;

performing a decoding operation on the second sample intermediate layer feature information, to obtain a sample residual image with a decreased quantity of channels, a quantity of channels of the sample residual image being the same as the quantity of channels of the second sample initial synthesized image;

calculating a second target loss value of the initial correction network based on the second sample source image, the label residual image, the second sample initial synthesized image, and the sample residual image; and determining the initial correction network as the target correction network in response to that the second target loss value meets a second loss condition.

19. The apparatus according to claim 18, wherein the calculating a second target loss value of the initial correction network based on the second sample source image, the label residual image, the second sample initial synthesized image, and the sample residual image comprises:

calculating a third loss value based on the sample residual image and the label residual image; and determining the third loss value and a reconstruction loss value of a second synthesis network together as the second target loss value, the second synthesis network being configured to generate the second sample initial synthesized image, and the reconstruction loss value being a loss value for performing the encoding operation and the decoding operation.

20. A non-transitory computer-readable storage medium, comprising a stored program, the program, when executed by a terminal device or a computer, causing the terminal device or the computer to perform:

obtaining a source image and a template image to be processed, the source image comprising source image identity information for synthesis, and the template image comprising template image background information for synthesis;

performing a target synthesis operation on the source image and the template image to obtain an initial synthesized image, the initial synthesized image comprising the source image identity information, the template image background information, and a partial region to be corrected;

performing a target correction operation on the source image, the template image, and the initial synthesized image to obtain a target residual image; and synthesizing the initial synthesized image with the target residual image to generate a target synthesized image, the target synthesized image comprising the source image identity information, the template image background information, and the partial region corrected based on the target residual image.

* * * * *